(12) United States Patent
Etter et al.

(10) Patent No.: US 7,369,916 B2
(45) Date of Patent: May 6, 2008

(54) DRILL PRESS

(75) Inventors: Mark A. Etter, Humboldt, TN (US); P. Brent Boyd, Jackson, TN (US); Craig A. Carroll, Milan, TN (US); Brent Stafford, McLemoresville, TN (US); Jeffrey A. Wessel, Stevensville, MI (US)

(73) Assignee: Black & Decker Inc., Newark, DE (US)

( * ) Notice: Subject to any disclaimer, the term of this patent is extended or adjusted under 35 U.S.C. 154(b) by 354 days.

(21) Appl. No.: 10/956,619

(22) Filed: Oct. 1, 2004

(65) Prior Publication Data

US 2006/0104731 A1    May 18, 2006

Related U.S. Application Data

(63) Continuation-in-part of application No. 10/744,612, filed on Dec. 23, 2003, which is a continuation-in-part of application No. 10/632,559, filed on Jul. 31, 2003, which is a continuation of application No. 10/463,206, filed on Jun. 16, 2003, which is a continuation-in-part of application No. 10/445,290, filed on May 21, 2003, and a continuation-in-part of application No. 10/413,455, filed on Apr. 14, 2003, application No. 10/956,619, which is a continuation-in-part of application No. 10/219,576, filed on Aug. 15, 2002.

(60) Provisional application No. 60/544,810, filed on Feb. 12, 2004, provisional application No. 60/509,877, filed on Oct. 9, 2003, provisional application No. 60/508,770, filed on Oct. 3, 2003, provisional application No. 60/429,840, filed on Nov. 27, 2002, provisional application No. 60/414,200, filed on Sep. 27, 2002, provisional application No. 60/373,752, filed on Apr. 18, 2002.

(51) Int. Cl.
*G06F 19/00* (2006.01)
*B26D 7/06* (2006.01)

(52) U.S. Cl. .......... 700/160; 700/180; 83/446; 83/469; 173/2

(58) Field of Classification Search .......... 700/159, 700/160, 180; 356/399; 408/8, 132, 712; 173/2; 83/446, 469; 82/171
See application file for complete search history.

(56) References Cited

U.S. PATENT DOCUMENTS 299,619 A    6/1884   Carson
408,790 A    8/1889   Butler (Continued)

FOREIGN PATENT DOCUMENTS

CN    2378150 Y    5/2000

(Continued)

OTHER PUBLICATIONS

"Instruction Manual Redeye® 1800W 184mm (7¼") Circular Saw with Laser Line Generator, Model LS5000 ," GMC Global Machinery Company, 45-55 South Centre Road, Melbourne Airport, Victoria 3045, Australia; 14 pages.

(Continued)

*Primary Examiner*—Leo Picard
*Assistant Examiner*—Sheela Rao
(74) *Attorney, Agent, or Firm*—Mehul R. Jani; Adan Ayala; Charles Yocum

(57) ABSTRACT

A power tool control system connected with a drill press provides a system for determining operational settings for the drill press and/or structural factors of a workpiece to be operated upon by the drill press. For instance, the power tool control system may establish a visual indication of the axis of operation of the drill press upon a workpiece and/or determine the thickness, structural composition, and/or moisture content of a workpiece. The determined axis of operation and/or structural factor is utilized to determine the operational settings of the power tool.

38 Claims, 25 Drawing Sheets

U.S. PATENT DOCUMENTS

| | | | |
|---|---|---|---|
| 411,925 A | 10/1889 | Linderman | |
| 714,098 A | 11/1902 | Caldwell | |
| 1,476,238 A | 12/1923 | Bump | |
| 1,804,764 A | 5/1931 | Grant | |
| 2,109,976 A | 3/1938 | Pierce, Jr. | 177/311 |
| 2,121,069 A | 6/1938 | Collins | 143/36 |
| 2,146,906 A | 2/1939 | Moller | 77/5 |
| 2,299,262 A | 10/1942 | Uremovich | 143/36 |
| 2,307,820 A | 1/1943 | Butters | 143/168 |
| 2,357,194 A | 8/1944 | Hazelton et al. | 164/47 |
| 2,407,845 A | 9/1946 | Nemeyer | 116/124 |
| 2,465,000 A | 3/1949 | Turner | 143/132 |
| 2,488,947 A | 11/1949 | Vavrik | 143/43 |
| 2,518,684 A | 8/1950 | Harris | 143/45 |
| 2,557,029 A | 6/1951 | Griffin | 88/39 |
| 2,806,492 A | 9/1957 | Becker | 143/168 |
| 2,850,054 A | 9/1958 | Eschenburg | 143/36 |
| 2,855,679 A | 10/1958 | Gibble | 33/46 |
| 3,005,477 A | 10/1961 | Sherwen | 143/47 |
| 3,011,529 A | 12/1961 | Copp | 143/36 |
| 3,013,592 A | 12/1961 | Ambrosio et al. | 143/36 |
| 3,124,178 A | 3/1964 | Packard | 143/36 |
| 3,179,458 A | 4/1965 | Sconzo | 292/341.15 |
| 3,344,819 A | 10/1967 | Mitchell | 143/36 |
| 3,572,937 A | 3/1971 | Baldwin | 356/110 |
| 3,597,091 A | 8/1971 | Bowker | 356/106 |
| 3,635,108 A | 1/1972 | Prince | 82/1 |
| 3,713,746 A | 1/1973 | Luthy | 408/8 |
| 3,728,027 A | 4/1973 | Watanabe | 356/13 |
| 3,780,777 A | 12/1973 | Davies | 144/3 N |
| 3,837,757 A | 9/1974 | Levine | 408/14 |
| 3,854,836 A | 12/1974 | Weissman | 408/14 |
| 3,891,039 A | 6/1975 | Lagerstrom | 175/40 |
| 3,970,359 A | 7/1976 | Starkweather | 350/7 |
| 3,972,582 A | 8/1976 | Oosaka et al. | 350/7 |
| 3,976,384 A | 8/1976 | Matthews et al. | 356/200 |
| 4,046,985 A | 9/1977 | Gates | 219/121 L |
| 4,078,869 A | 3/1978 | Honeycutt | 408/16 |
| 4,184,394 A | 1/1980 | Gjerde | 83/477.1 |
| 4,255,056 A | 3/1981 | Peterson | 356/401 |
| 4,257,297 A | 3/1981 | Nidbella | 83/471.3 |
| 4,319,403 A | 3/1982 | Stearns | 33/185 R |
| 4,338,723 A | 7/1982 | Benjamin | 33/174 L |
| 4,383,373 A | 5/1983 | Couturier | 33/286 |
| 4,386,532 A | 6/1983 | Benjamin | 73/862.04 |
| 4,413,662 A | 11/1983 | Gregoire et al. | 144/356 |
| 4,438,567 A | 3/1984 | Raiha | 33/286 |
| 4,447,956 A | 5/1984 | Chung | 33/172 D |
| 4,450,627 A | 5/1984 | Morimoto | 30/391 |
| 4,468,992 A | 9/1984 | McGeehee | 83/56 |
| 4,469,318 A | 9/1984 | Slavic | 269/91 |
| 4,469,931 A | 9/1984 | Macken | 219/121 LG |
| 4,503,740 A | 3/1985 | Brand et al. | 83/521 |
| 4,530,624 A * | 7/1985 | Cuneo | 408/8 |
| 4,534,093 A | 8/1985 | Jahnke et al. | 29/26 A |
| 4,566,202 A | 1/1986 | Hamar | 33/286 |
| 4,581,808 A | 4/1986 | Lawson et al. | 29/558 |
| 4,589,208 A | 5/1986 | Iwasaki et al. | 30/376 |
| 4,598,481 A | 7/1986 | Donahue | 33/288 |
| 4,607,555 A | 8/1986 | Erhard | 83/471.2 |
| 4,651,732 A | 3/1987 | Frederick | 128/303 R |
| 4,676,130 A | 6/1987 | Nutt | 83/155 |
| 4,723,911 A | 2/1988 | Kurtz | 433/27 |
| 4,725,933 A | 2/1988 | Houk | 362/287 |
| 4,775,205 A | 10/1988 | Muramatsu | 350/6.8 |
| 4,803,976 A | 2/1989 | Frigg et al. | 128/92 |
| 4,805,500 A | 2/1989 | Saito et al. | 83/277 |
| 4,817,839 A | 4/1989 | Weissman | 225/2 |
| 4,820,911 A | 4/1989 | Arackellian et al. | 235/467 |
| 4,833,782 A | 5/1989 | Smith | 30/392 |
| 4,836,671 A | 6/1989 | Bautista | 356/1 |
| 4,885,965 A | 12/1989 | Veissman | 83/100 |
| 4,885,967 A | 12/1989 | Bell et al. | 83/520 |
| 4,887,193 A | 12/1989 | Dieckmann | 362/89 |
| 4,934,233 A | 6/1990 | Brundage et al. | 83/397 |
| 4,945,797 A | 8/1990 | Hahn | 83/75.5 |
| 4,964,449 A | 10/1990 | Conners | 144/286 R |
| 4,976,019 A | 12/1990 | Kitamura | 29/26 A |
| 4,978,246 A | 12/1990 | Quenzi et al. | 404/84 |
| 5,013,317 A | 5/1991 | Cole et al. | 606/96 |
| 5,031,203 A | 7/1991 | Trecha | 378/205 |
| 5,038,481 A | 8/1991 | Smith | 30/392 |
| 5,052,112 A | 10/1991 | MacDonald | 33/263 |
| 5,148,232 A | 9/1992 | Duey et al. | 356/152 |
| 5,159,864 A | 11/1992 | Wedemeyer et al. | 83/13 |
| 5,159,869 A | 11/1992 | Tagliaferri | 83/862 |
| 5,161,922 A | 11/1992 | Malloy | 408/14 |
| 5,203,650 A | 4/1993 | McCourtney | 408/1 R |
| 5,207,007 A | 5/1993 | Cucinotta et al. | 33/640 |
| 5,212,720 A | 5/1993 | Landi et al. | 378/206 |
| 5,267,129 A | 11/1993 | Anderson | 362/96 |
| 5,283,808 A | 2/1994 | Cramer et al. | 378/206 |
| 5,285,708 A | 2/1994 | Bosten et al. | 83/520 |
| 5,316,014 A | 5/1994 | Livingston | 128/754 |
| 5,320,111 A | 6/1994 | Livingston | 128/754 |
| 5,357,834 A | 10/1994 | Ito et al. | 83/471.3 |
| 5,365,822 A | 11/1994 | Stapleton et al. | 83/745 |
| 5,375,495 A | 12/1994 | Bosten et al. | 83/520 |
| 5,387,969 A | 2/1995 | Marantette | 356/4.5 |
| 5,426,687 A | 6/1995 | Goodall et al. | 378/206 |
| 5,439,328 A | 8/1995 | Haggerty et al. | 408/1 R |
| 5,446,635 A | 8/1995 | Jehn | 362/259 |
| 5,461,790 A | 10/1995 | Olstowski | 30/391 |
| 5,481,466 A | 1/1996 | Carey | 364/474.09 |
| 5,488,781 A | 2/1996 | Van Der Horst | 33/617 |
| 5,495,784 A | 3/1996 | Chen | 83/471.2 |
| 5,522,683 A | 6/1996 | Kakimoto et al. | 408/13 |
| 5,529,441 A | 6/1996 | Kosmowski et al. | 408/1 R |
| 5,546,840 A | 8/1996 | Supe-Dienes | 83/478 |
| 5,579,102 A | 11/1996 | Pratt et al. | 356/3.12 |
| 5,593,606 A | 1/1997 | Owen et al. | 219/121.71 |
| 5,644,616 A | 7/1997 | Landi et al. | 378/206 |
| 5,661,775 A | 8/1997 | Cramer et al. | 378/206 |
| 5,662,017 A | 9/1997 | Mellon | 83/169 |
| 5,667,345 A | 9/1997 | Wiklund | 408/1 R |
| 5,675,899 A | 10/1997 | Webb | 30/390 |
| 5,720,213 A | 2/1998 | Sbervegleri | 83/471.3 |
| 5,741,096 A * | 4/1998 | Olds | 408/1 R |
| 5,777,562 A | 7/1998 | Hoffman | 340/870.07 |
| 5,782,842 A | 7/1998 | Kloess et al. | 606/130 |
| 5,784,792 A | 7/1998 | Smith | 33/227 |
| 5,791,841 A * | 8/1998 | Zones | 409/132 |
| 5,797,670 A | 8/1998 | Snoke et al. | 362/119 |
| 5,819,625 A | 10/1998 | Sbervegleri | 83/471.3 |
| 5,835,517 A | 11/1998 | Jayaraman et al. | 372/50 |
| 5,835,519 A | 11/1998 | Tsukamoto et al. | 372/55 |
| 5,862,727 A | 1/1999 | Kelly | 83/13 |
| 5,911,482 A | 6/1999 | Campbell et al. | 30/390 |
| 5,918,523 A | 7/1999 | Cutter | 83/520 |
| 5,943,931 A | 8/1999 | Stumpf et al. | 83/468.2 |
| 5,943,932 A | 8/1999 | Sbervegleri | 83/471.3 |
| 5,949,810 A | 9/1999 | Star et al. | 372/108 |
| 5,968,383 A | 10/1999 | Yamazaki et al. | 219/121.75 |
| 5,979,523 A | 11/1999 | Puzio et al. | 144/286.5 |
| 5,995,230 A | 11/1999 | Madlener et al. | 356/375 |
| 5,996,460 A | 12/1999 | Waite | 83/520 |
| 6,023,071 A | 2/2000 | Ogura et al. | 250/586 |
| 6,035,757 A | 3/2000 | Caluori et al. | 83/520 |
| 6,076,445 A | 6/2000 | Kenyon et al. | 83/477.2 |
| 6,137,577 A | 10/2000 | Woodworth | 356/376 |
| 6,137,579 A * | 10/2000 | Reilley | 356/399 |
| 6,152,372 A | 11/2000 | Colley et al. | 235/472.01 |
| 6,209,597 B1 | 4/2001 | Calcote | 144/326 |
| 6,223,794 B1 | 5/2001 | Jones | 144/135.2 |

| | | | | | |
|---|---|---|---|---|---|
| 6,239,913 B1 | 5/2001 | Tanaka ........................ 359/619 | JP | 62274738 | 11/1987 |
| 6,263,584 B1 | 7/2001 | Owens ........................ 33/640 | JP | 63162143 | 7/1988 |
| 6,283,002 B1 | 9/2001 | Chiang ........................ 83/477.1 | JP | 08197381 | 8/1996 |
| 6,301,997 B1 | 10/2001 | Welte ........................ 81/54 | JP | 10-109253 | 4/1998 |
| 6,328,505 B1 | 12/2001 | Gibble ........................ 408/16 | JP | 11-170203 | 6/1999 |
| 6,375,395 B1 | 4/2002 | Heintzeman ................ 408/16 | JP | 200-225603 | 8/2000 |
| 6,413,022 B1 | 7/2002 | Sarh ........................ 408/76 | JP | 2000-225602 | 8/2000 |
| 6,419,426 B1 | 7/2002 | Chalupa et al. ............. 408/1 R | JP | 2000-317901 | 11/2000 |
| 6,460,768 B2 | 10/2002 | Ring et al. ............. 235/462.43 | JP | 2001-150401 | 6/2001 |
| D465,165 S | 11/2002 | Doyle et al. ................. D10/65 | JP | 2001-157951 | 6/2001 |
| 6,493,955 B1 | 12/2002 | Moretti ........................ 33/451 | JP | 2001-158003 | 6/2001 |
| 6,494,590 B1 | 12/2002 | Paganini et al. ............ 362/119 | JP | 2001-300818 | 10/2001 |
| 6,530,303 B1 | 3/2003 | Parks et al. .................... 83/473 | JP | 2001-300902 | 10/2001 |
| 6,536,536 B1 * | 3/2003 | Gass et al. ...................... 173/2 | JP | 2001-347501 | 12/2001 |
| 6,546,835 B2 | 4/2003 | Wang ........................ 83/477.1 | TW | 537083 | 12/1990 |
| 6,550,118 B2 | 4/2003 | Smith et al. ................. 29/26 A | TW | 517615 | 5/1991 |
| 6,565,227 B1 | 5/2003 | Davis ........................ 362/119 | TW | 411888 | 11/2000 |
| 6,584,695 B1 | 7/2003 | Chang ........................ 30/391 | | | |
| 6,587,184 B2 | 7/2003 | Wursch et al. ............. 356/4.01 | | | |
| 6,593,587 B2 * | 7/2003 | Pease .................... 250/559.19 | | | |
| 6,621,565 B2 | 9/2003 | Pratt et al. ................ 356/141.4 | | | |
| 6,644,156 B2 | 11/2003 | Villacis ........................ 83/425 | | | |
| 6,647,868 B2 | 11/2003 | Chen ........................ 100/99 | | | |
| 6,662,457 B2 | 12/2003 | Dameron .................... 33/286 | | | |
| 6,684,750 B2 | 2/2004 | Yu ........................ 83/473 | | | |
| 6,688,203 B2 | 2/2004 | Chen ........................ 83/520 | | | |
| 6,736,042 B2 | 5/2004 | Behne et al. .............. 83/440.2 | | | |
| 6,736,044 B2 | 5/2004 | Chang ........................ 83/473 | | | |
| 6,739,042 B2 | 5/2004 | Thorum ........................ 29/832 | | | |
| 6,763,597 B2 | 7/2004 | Lysen ........................ 33/286 | | | |
| 2001/0028025 A1 | 10/2001 | Pease ........................ 250/208.1 | | | |
| 2001/0029819 A1 | 10/2001 | Okouchi ........................ 83/13 | | | |
| 2001/0034951 A1 | 11/2001 | Sears ........................ 33/640 | | | |
| 2001/0049988 A1 | 12/2001 | Ushiwata et al. ............. 83/520 | | | |
| 2002/0000148 A1 | 1/2002 | Brun ........................ 83/520 | | | |
| 2002/0054491 A1 | 5/2002 | Casas ........................ 362/119 | | | |
| 2002/0059781 A1 | 5/2002 | Chen ........................ 100/35 | | | |
| 2002/0131267 A1 | 9/2002 | Van Osenbruggen ....... 362/109 | | | |
| 2002/0146295 A1 | 10/2002 | Schaer et al. ................. 408/16 | | | |
| 2002/0164217 A1 | 11/2002 | Peterson .................... 408/1 R | | | |
| 2002/0170404 A1 | 11/2002 | Peot et al. .................... 83/478 | | | |
| 2003/0000355 A1 | 1/2003 | Butler et al. .................... 83/13 | | | |
| 2003/0010173 A1 | 1/2003 | Hayden ........................ 83/520 | | | |
| 2003/0027353 A1 | 2/2003 | Bright et al. ................ 436/173 | | | |
| 2003/0029050 A1 | 2/2003 | Fung et al. .................... 33/626 | | | |
| 2003/0101857 A1 | 6/2003 | Chuang ........................ 83/477.1 | | | |
| 2003/0150312 A1 | 8/2003 | Chang ........................ 83/473 | | | |
| 2003/0197138 A1 | 10/2003 | Pease et al. ........... 250/559.19 | | | |
| 2003/0200851 A1 | 10/2003 | Yu ........................ 83/471.3 | | | |
| 2003/0209678 A1 | 11/2003 | Pease .................... 250/559.19 | | | |
| 2003/0233921 A1 | 12/2003 | Garcia et al. ................. 83/520 | | | |
| 2004/0032587 A1 * | 2/2004 | Garcia et al. ................ 356/399 | | | |

FOREIGN PATENT DOCUMENTS

| | | |
|---|---|---|
| CN | 2508922 Y | 9/2002 |
| CN | 2528568 Y | 1/2003 |
| CN | 2546122 Y | 4/2003 |
| DE | 2838968 | 3/1980 |
| DE | 3324428 | 1/1984 |
| DE | 3333428 | 4/1985 |
| DE | 3918070 | 12/1990 |
| DE | 4435573 | 4/1996 |
| DE | 19819332 | 11/1998 |
| DE | 19907880 | 8/2000 |
| DE | 10037532 | 2/2001 |
| EP | 0366039 | 5/1990 |
| EP | 0504745 | 3/1991 |
| JP | 55125954 | 9/1980 |
| JP | 61061705 | 3/1986 |
| JP | 61131246 | 6/1986 |
| JP | 61159312 | 7/1986 |
| JP | 62166914 | 7/1987 |

OTHER PUBLICATIONS

"Instruction Manual Redeye® 305mm (12") Compound Mitre Saw with Laser Line Generator, Model LMS305 ," GMC Global Machinery Company, 45-55 South Centre Road, Melbourne Airport, Victoria 3045, Australia; 19 pages.

"Instruction Manual Redeye® 2000W 250mm (10") Table Saw with Laser Line Generator, Model LS250TS," GMC Global Machinery Company, 45-55 South Centre Road, Melbourne Airport, Victoria 3045, Australia; 20 pages.

"Product Picks from the National Hardware Show"; Fall Homes 1992; Sep. 23, 1992; 2 pages.

"Delta, Building Trades and Home Shop Machinery"; Catalog published in Jan. 1993; (see generally pp. 5-25), 84 pages.

Craftsman Operator's Manual, "Laser Compound Miter Saw with Retractable Laser Trac® System, Model No. 137.212540," Part No. 137212540001; Sears, Roebuck and Co., Hoffman Estates, IL 60179; www.sears.com/craftsman; © Sears, Roebuck and Co.; 34 pages.

"Hitachi Model C 10FSH and C 10FSB Slide Compound Saw, Safety Instructions and Instruction Manual," issued by Hitachi Koki Co., Ltd., Shinagawa Intercity Tower A, 15-1, Konan 2-chome, Minato-ku, Tokyo 108-6020, Japan; pp. 1-30, 88, 90, and 92; 33 pages.

Two (2) Images of Laserkerf Model 125; Laserkerf, 669 Burton Pike, Georgetown, KY 40324; www.laserkerf.com; 2 pages.

Four (4) Images of Hitachi Model C10FSH—255mm (10") Slide Compound Saw with Laser Marker; Hitachi Koki Co., Ltd., Shinagawa Intercity Tower A, 15-1, Konan 2-chome, Minato-ku, Tokyo 108-6020, Japan; http://www.hitachi-koki.com/powertools/products/cutter/c10fsh/c10fsh.html; 5 pages.

One (1) Image of Hitachi Model C10FCH—255mm (10") Slide Compound Saw; Hitachi Koki Co., Ltd., Shinagawa Intercity Tower A, 15-1, Konan 2-chome, Minato-ku, Tokyo 108-6020, Japan; http://www.hitachi-koki.com/powertools/products/cutter/c10fce/c10fce.html; 1 page.

One (1) Image of Craftsman Model 21206—Craftsman Professional Laser Trac™ 12 in. Sliding Compound Miter Saw; Sears Holding Corporation, 3333 Beverly Road, Hoffman Estates, IL 60179; http://www.sears.com/sr/javasr/product.do?BV_UseBVCookie=Yes&vertical=TOOL&fromAuto=YES&bidsite=CRAFT&pid=00921206000; 1 page.

One (1) Image of Craftsman Model 28060—Craftsman 15 amp Circular Saw with Laser Trac™ Laser Guide; Sears Holding Corporation, 3333 Beverly Road, Hoffman Estates, IL 60179; http://www.sears.com/sr/javasr/product.do?BV_UseBVCookie=Yes&vertical=TOOL&pid=00928060000; 1 page.

Five (5) Image of Craftsman Model 21209—Craftsman 10 in. Compound Miter Saw with LaserTrac™; Sears Holding Corporation, 3333 Beverly Road, Hoffman Estates, IL 60179; http://www.sears.com/sr/javasr/product.do?BV_UseBVCookie=Yes&vertical=TOOL&pid=00921209000&tab=des#tablink; 1 page.

Two (2) Images of GMC Model LMS305—305mm Compound Mitre Saw with REDEYE® Laser Line Generator; Global Machinery Company; 45-55 South Centre Road, Melbourne Airport, Victoria 3045, Australia; http://203.89.231.185/index.cfm?ppage=products&pproduct_uuid=B695359F-AB36-4219-AB89F2C2FE9B78B8; 3 pages.

Two (2) Images of Rockwell Model RW2115L—7¼" Laser Circular Saw; Rockwell Tools; 866-748-6657; http://www.rockwelltools.com/pages/1/index.htm; 3 pages.

* cited by examiner

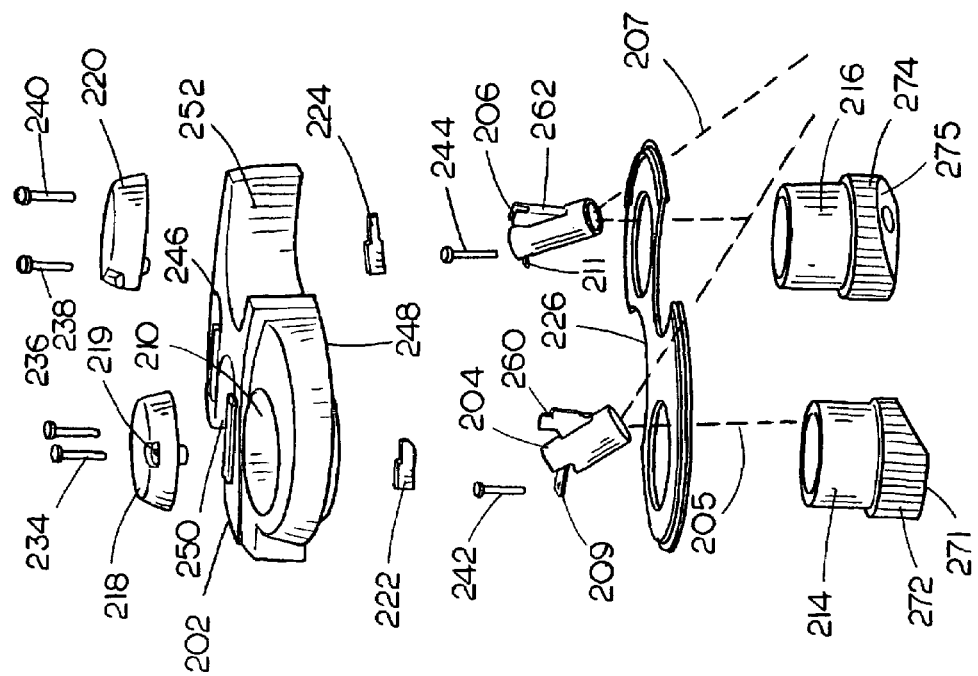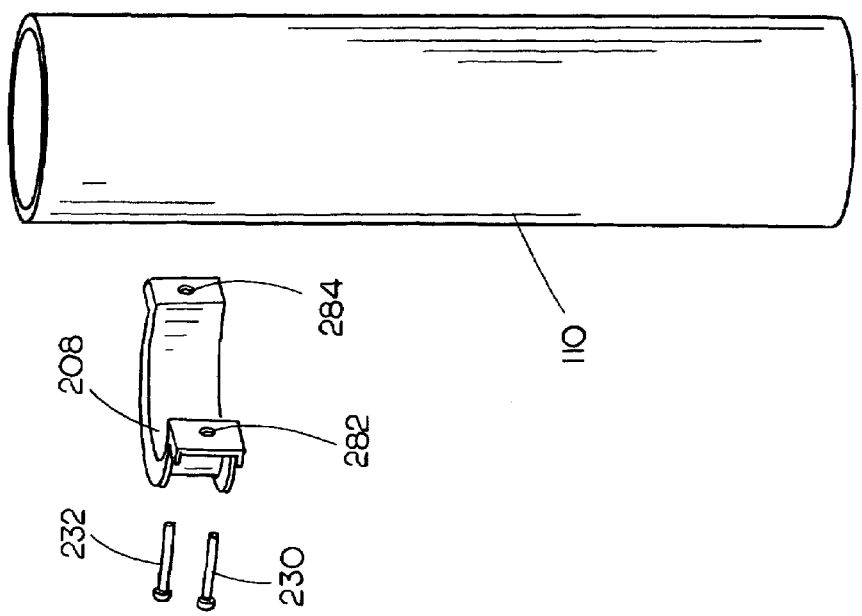
FIG. 6

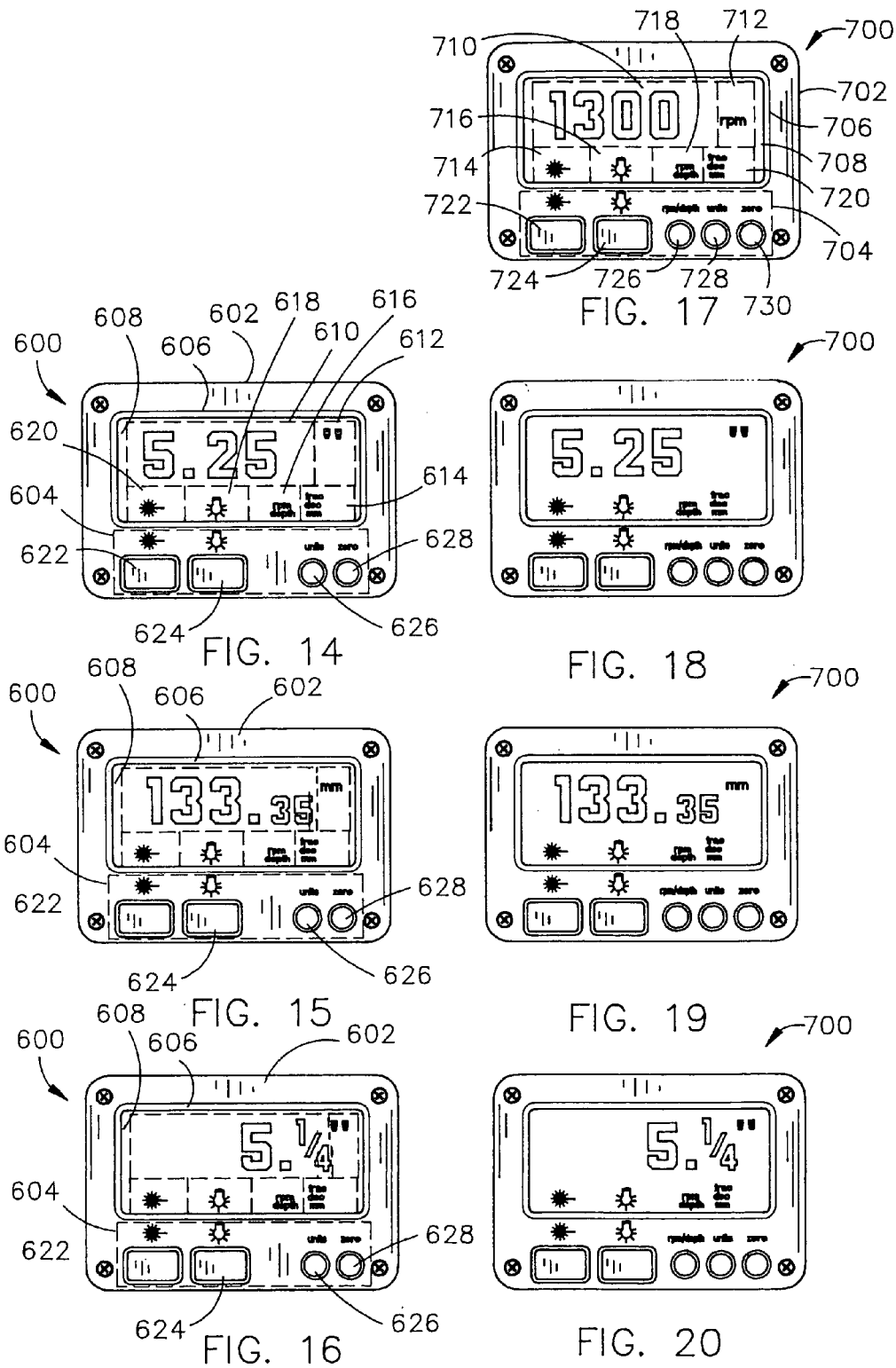

DRILL PRESS

CROSS-REFERENCE TO RELATED APPLICATIONS

The present application is a continuation-in-part of U.S. application Ser. No. 10/744,612, filed on Dec. 23, 2003; which is a continuation-in-part of U.S. application Ser. No. 10/632,559, filed on Jul. 31, 2003; which is a continuation of U.S. application Ser. No. 10/463,206, filed on Jun. 16, 2003; which is a continuation-in-part of U.S. application Ser. No. 10/445,290, filed on May 21, 2003; which claims priority under 35 U.S.C. § 119 to U.S. Provisional Application Ser. No. 60/429,840, filed on Nov. 27, 2002; U.S. application Ser. No. 10/445,290 additionally claims priority as a continuation-in-part of U.S. application Ser. No. 10/413,455, filed on Apr. 14, 2003; which claims priority under 35 U.S.C. § 119 to U.S. Provisional Application 60/414,200, filed on Sep. 27, 2002 and U.S. Provisional Application 60/373,752, filed on Apr. 18, 2002; the present application additionally claims priority under 35 U.S.C. § 119 to the U.S. Provisional Application Ser. No. 60/508,770, filed on Oct. 3, 2003; and the U.S. Provisional Application Ser. No. 60/509,877, filed on Oct. 9, 2003; and the U.S. Provisional Application Ser. No. 60/544,810, filed on Feb. 12, 2004; the present application is additionally a continuation-in-part of U.S. application Ser. No. 10/219,576, filed on Aug. 15, 2002. The U.S. applications, Ser. Nos. 10/744,612, 10/632,559, 10/463,206, 10/445,290, 60/429,840, 10/413,455, 60/414,200, 60/373,752, 60/508,770, 60/509,877, and 60/544,810 are herein incorporated by reference in their entireties.

FIELD OF THE INVENTION

The present invention generally relates to the field of power tools, and particularly to a power tool control system for a drill press.

BACKGROUND OF THE INVENTION

The use of power tools, such as drill presses, is commonplace in numerous locations, from construction work sites to home work shops. These power tool devices are used to perform their functions on a variety of different workpieces, such as wood, metal, plastic, and the like.

When performing boring operations upon a workpiece, various structural factors, such as the thickness of the workpiece, hardness of the workpiece, moisture content of the workpiece, and the like may significantly affect the operation of the drill press. Unfortunately, current drill presses may not provide an effective measure of structural factors, such as the thickness of the workpiece, hardness of the workpiece, moisture content of the workpiece, and the like to be operated upon. This may contribute to the inefficient operation of the drill press which may result in decreased productivity. Further, this may contribute to a reduced life span of useful operation of the drill press due to increased operational stresses being placed upon the tool which may result in increased wearing of the working parts of the tool. Further, some current drill presses may fail to provide an efficient system for reducing the speed of the drill press prior to cutting through the workpiece. This may also contribute to a reduced life span of the drill press.

Therefore, it would be desirable to provide a device, which enables the user of a drill press to determine the operational settings of the drill press based on determined structural factors of a work piece.

SUMMARY OF THE INVENTION

Accordingly, the present invention is directed to a power tool control system for determining operational settings of a drill press. The operational settings of the drill press are determined by the power tool control system providing a system for determining a structural factor(s) of a workpiece. For instance, the power tool control system may determine the thickness of a workpiece, the hardness of the workpiece, the moisture content of the workpiece, or the like, which is to be bored through by the drill press. The determined structural factor is then provided to the user of the power tool, whereby the operational settings of the drill press may be adjusted to assist in providing increased efficiency in the operation of the drill press. In addition, the power tool control system may enable the variation of operational settings during the use of the power tool. The increased efficiency in operation of the drill press may increase the useful lifespan of the power tool.

It is an object of the present invention to provide a power tool control system for a drill press which may automatically configure the operational settings of the drill press to assist in maximizing the efficient operation of the drill press. It is a further object of the present invention to provide a visual indication, to a user of the drill press, of the location of operation of a drill bit upon a workpiece engaged with the drill press.

It is contemplated that the present invention provides a bench assembly including a work table which is adjustable and provides for the indexing of a workpiece when engaged upon the work table. It is a further object of the present invention to provide a dust collection system to the drill press.

It is an object of the present invention to provide a laser enabled power tool control system. Thus, the power tool control system utilizes one or more laser sources, mounted with the drill press, to emit one or more laser beams. The laser beams provide operational settings information related to the position of the drill bit and structural factors of the workpiece and visual indicators to assist a user in the operation of the drill press. The laser sources and mounts may be removable from their connection with one another and the drill press, allowing for the retro-fitting of various secondary component features of the power tool control system.

In an additional aspect of the present invention, a method of operating a drill press is provided. The distance from a casing including a laser source, of a power tool control system, to a work table of the drill press is determined. After the distance is determined a workpiece is positioned upon the work table. The distance from the casing to the workpiece is now determined. After determining both distances by the use of the power tool control system the thickness of the workpiece is calculated. The thickness data is provided to the user of the drill press who then determines the operational settings of the drill press based on the data. In the alternative, the power tool control system may provide for an automatic setting of the operational settings. With the operational settings established the user engages the drill press upon the workpiece.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 6 is an exploded view of the power tool control system in accordance with an exemplary embodiment of the present invention;

FIGS. 14, 15, and 16 illustrate a second exemplary embodiment of a user interface of the power tool control system;

FIGS. 17, 18, 19, and 20 illustrate a third exemplary embodiment of a user interface of the power tool control system;

DETAILED DESCRIPTION OF THE INVENTION

Reference will now be made in detail to the presently preferred embodiments of the invention, examples of which are illustrated in the accompanying drawings.

Figure 1:
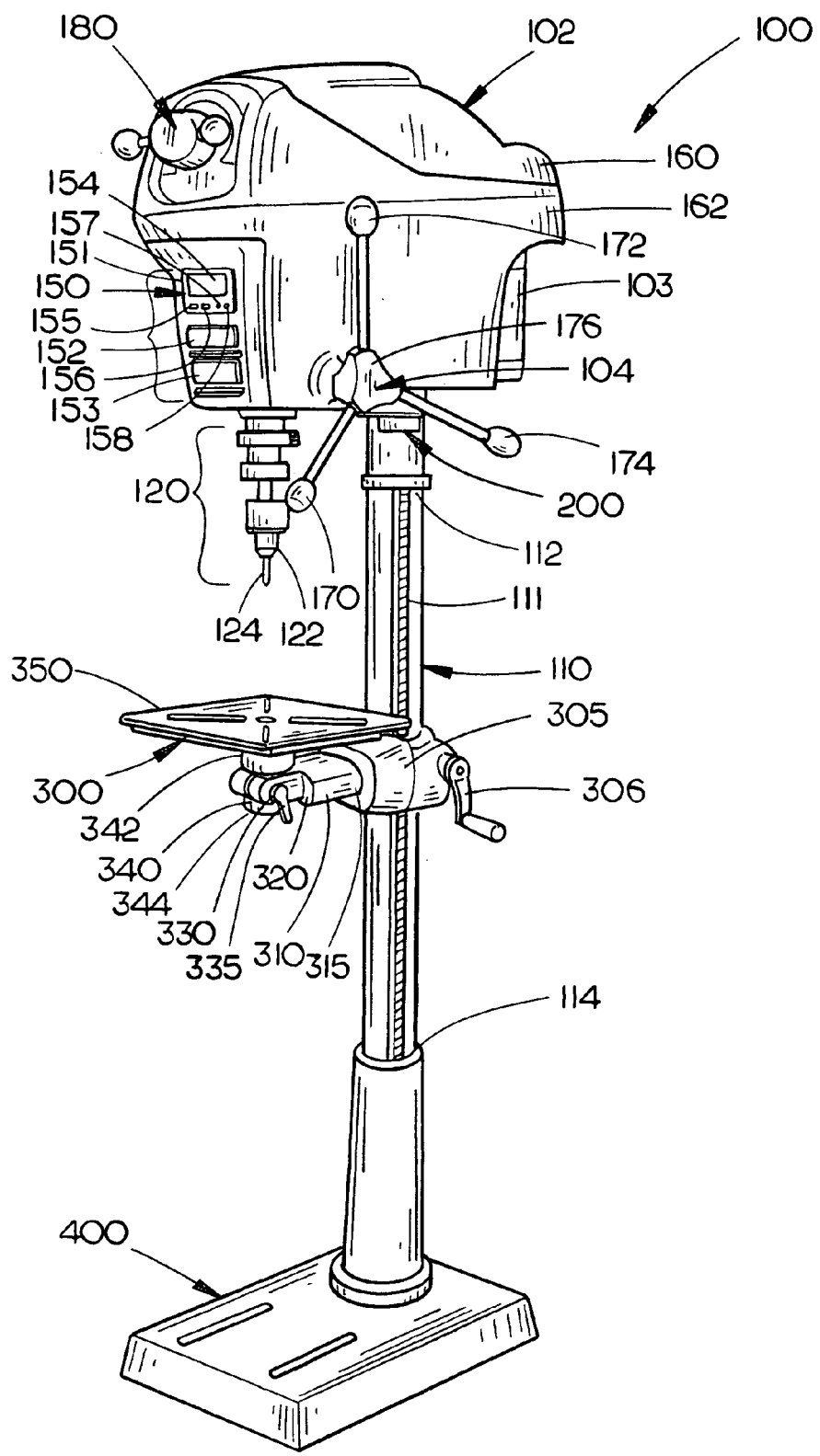
FIG. 1 is an illustration of a drill press including a power tool control system in accordance with an exemplary embodiment of the present invention.
Figure 2:
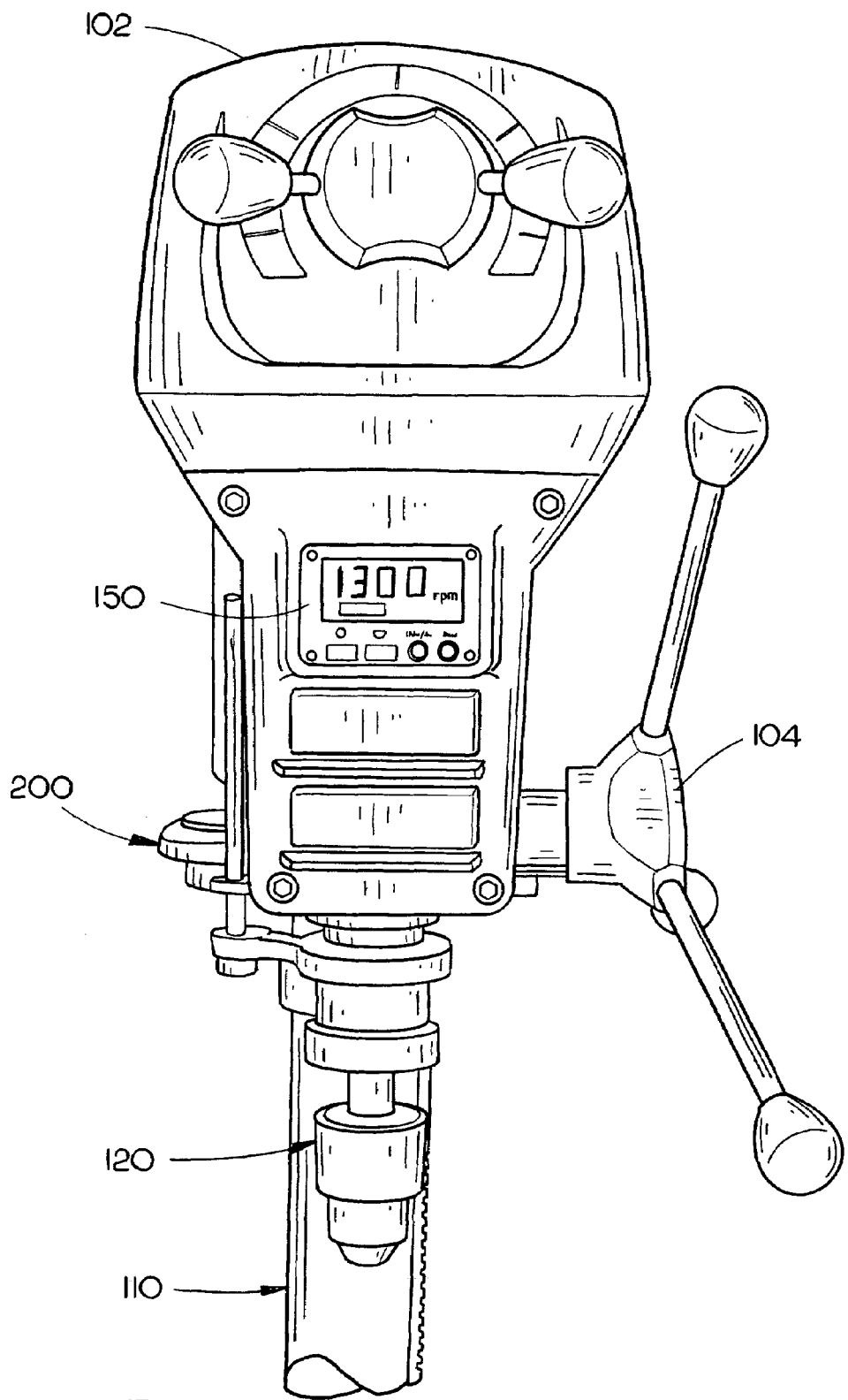
FIG. 2 is a partial front plan view illustrating the drill press including a user interface of the power tool control system in accordance with an exemplary embodiment of the present invention.
Figure 3:
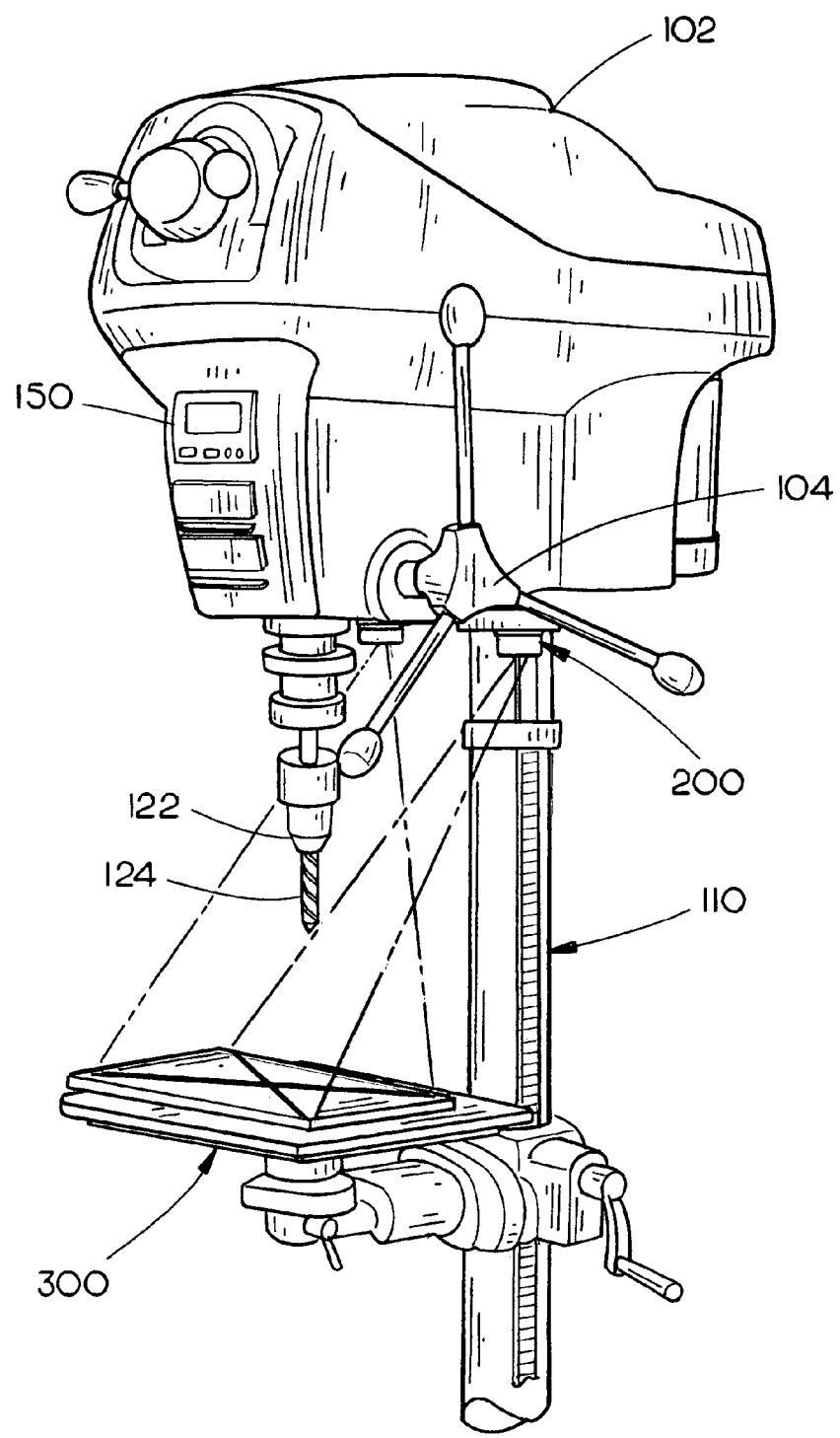
FIG. 3 is a partial illustration of the drill press and power tool control system, wherein a first and second laser source are emitting a first and second laser beam for contacting a workpiece seated upon a bench of the drill press.
Figure 4:
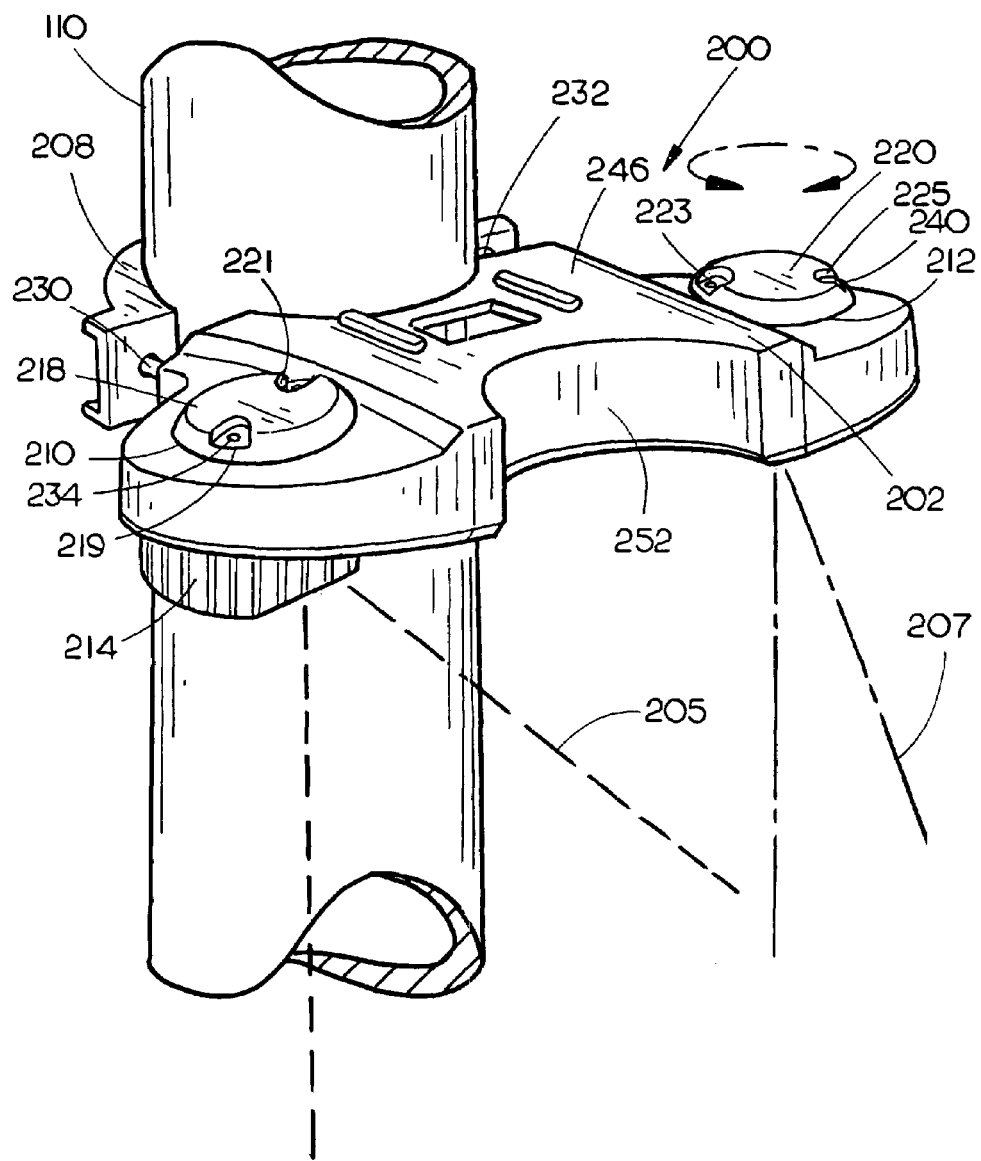
FIG. 4 is an isometric illustration of a bench column of the drill press connected with a casing of the power tool control system, the casing connected via a bracket with the bench column, the casing further connecting with a first and second laser mount which establish the position of the first and second laser sources.
Figure 5:
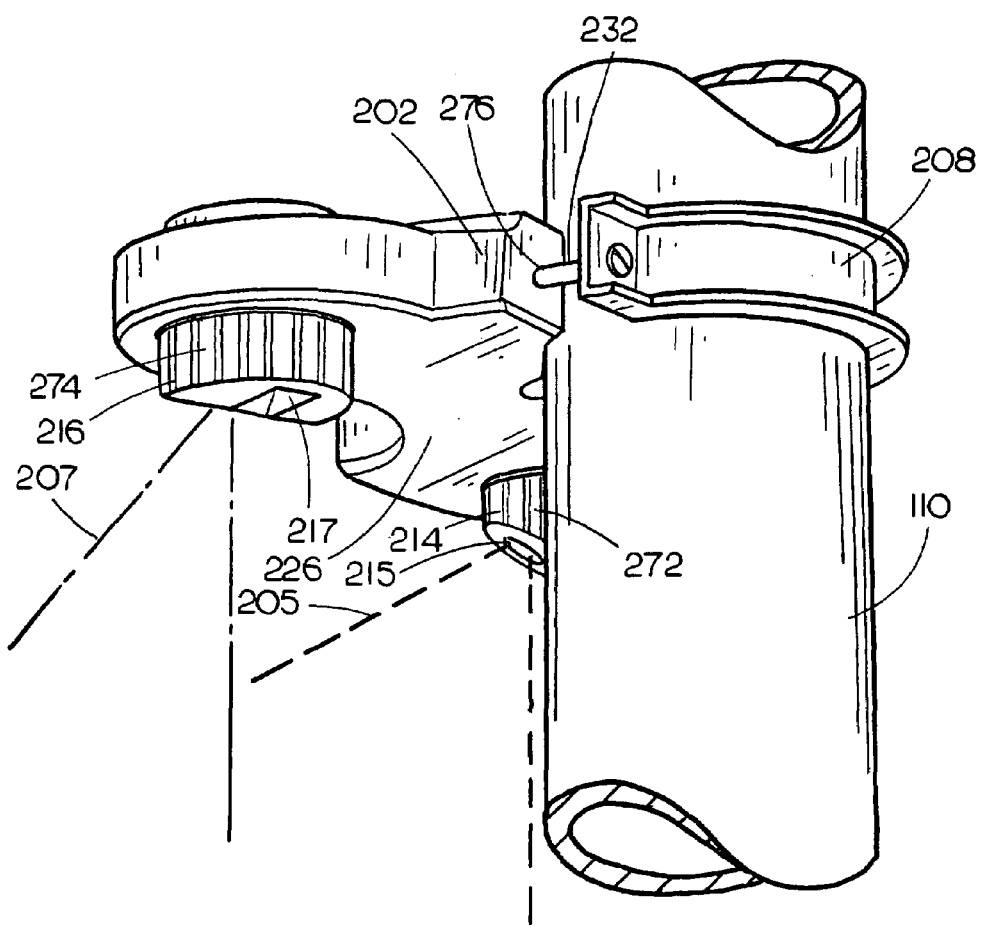
FIG. 5 is a bottom plan side elevation view of the casing, including the first and second laser mounts, of the power tool control system.
Figure 7:
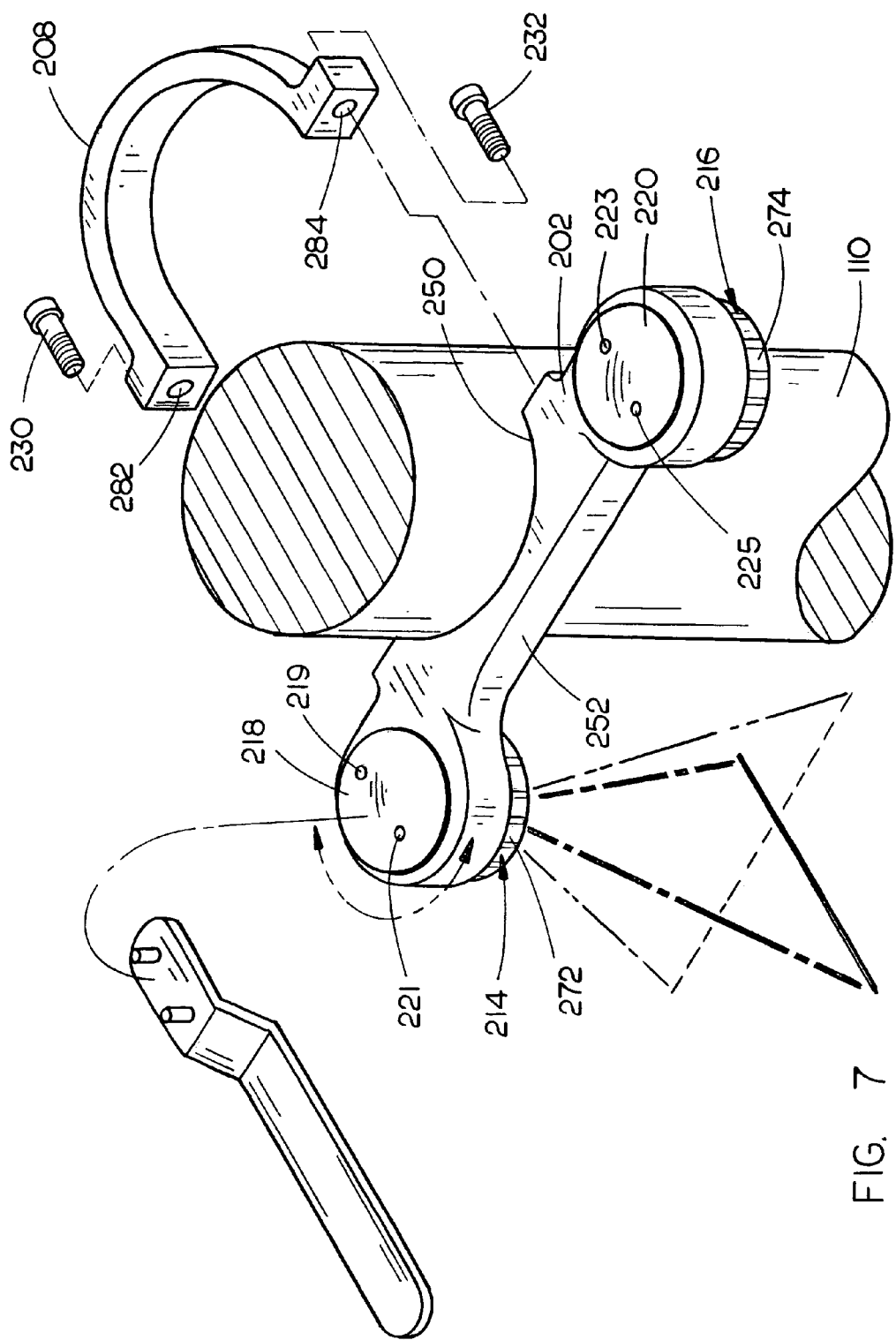
FIG. 7 is a top plan view illustrating the adjustment capabilities of the first and second laser mounts and sources, via engagement of a spanner wrench with the first and second covers which are connected to the first and second laser mounts.

Referring now to FIG. 1, a drill press 100 includes a head assembly 102 adjustably connected with a first end 112 of a bench column 110, the head assembly 102 at least partially encompassing a motor 103 operationally coupled with a quill assembly 120 which, through a spindle and chuck 122, couples with a drill bit 124. The quill assembly 120, through the drill bit 124, providing an axis of operation for the drill press 100. A crank mechanism 104 (feed handle assembly) is connected with the quill assembly 120 through the head casing 102. The crank mechanism 104 providing the user controlled "press" action for the drill bit 124. The bench column 110 is adjustably connected with a bench assembly 300 and connects with a stabilizing stand assembly 400 at a second end 114 of the bench column 110. A power tool control system 200 is connected with the bench column 110.

The power tool control system 200 is a non-contact measurement and alignment device including a casing 202 housing a first laser source (laser generator) 204 and a second laser source (laser generator) 206. The casing 202 is connected with the bench column 110, via a bracket 208. The power tool control system 200 providing a non-contact measurement and alignment system which may operate in correlation with the axis of operation of the drill press 100 or the bench assembly 300 to provide operational setting information for the drill press 100. Additionally, the power tool control system 200 may operate to provide operational setting information for the drill press 100 based on structural factors of a workpiece, which is to be engaged with the drill press 100. Structural factors may include the thickness of the workpiece, the hardness of the workpiece (i.e., density of the material composition of the workpiece), the amount of moisture within the workpiece, and the like which provide an indication of the structural integrity of the workpiece, thereby, providing an indication of operational settings of the drill press 100 for operation upon the workpiece.

In the current embodiment, the power tool control system 200 is communicatively coupled with a user interface (control panel) 150. The user interface (control panel) 150 is connected with the head assembly 102 and includes a housing 151 including a display 154 which provides a readout to a user of the drill press 100 of various information relating to the operation of the drill press 100. The housing 151 includes the display screen 154 and a selector assembly comprising various selectors 155, 156, 157, and 158. The user interface (control panel) 150 is further described below in reference to FIGS. 11 through 20 below. The user interface further includes a first selector 152 and a second selector 153 allowing for user control over the operation of the drill press 100. In a preferred embodiment, the first and second selectors provide a user selectable on/off functionality for the drill press 100. It is contemplated that the first and second selector 152 and 153 may provide various other functional capabilities without departing from the scope and spirit of the present invention. For instance, the first selector 152 may turn on/off the motor 103 and the second selector 153 may provide control over the quill assembly and rotation of the drill bit. In such a situation, a first position of the second selector 153 may allow the motor 103 to run without engaging (i.e., rotating) the quill assembly 120, thereby avoiding rotation of the drill bit 124. In a second position, the second selector 153 may engage the motor to impart a rotational movement to the drill bit 124 through the quill assembly 120.

In a preferred embodiment, the casing 202 includes a first receiver 210 and a second receiver 212 for connecting with the first and second laser sources. The first and second receivers are constructed as apertures through the casing 202. The first receiver 210 is constructed as an aperture for receiving a first laser mount 214 and the second receiver 212 is constructed as an aperture for receiving a second laser mount 216. The first and second receivers are constructed in a spatial relation to one another within the casing 202 to assist in optimizing the performance of the power tool control system. The spatial relationship between the first and second receivers may be variously configured as contemplated by one of ordinary skill in the art. For example, the first and second receivers may be spatially remote from one another, having a separation distance of approximately two inches, which may optimize the performance of the power tool control system by positioning the first and second laser sources at an optimum distance from one another. It is contemplated that the spatial relationship between the first and second receivers may range from less than two inches to greater than two inches in order to optimize the performance of the power tool control system 200.

The first laser mount 214 is constructed for generally containing and securely connecting the first laser source 204 within. The first laser source 204 includes a first laser source receiver 209. The first laser source receiver 209 allows for a fastener 242 to connect through the first laser source receiver 209 and to the first laser mount 214. The second laser mount 216 is constructed for connecting the second laser source 206 within. The second laser source 206 includes a second laser source receiver 211 through which a fastener 244 securely fastens the second laser source 206 to the second laser mount 216. In the current embodiment, the fasteners 242 and 244 are threaded bolts, which connect within the first and second laser mounts, respectively. It is contemplated that various fastener/connection mechanisms may be employed to connect the first and second laser sources within the first and second laser mounts. For example, a friction fit mechanism may allow for the laser sources to be securely connected with the laser mounts. Alternatively, a snap fit mechanism or compression lock mechanism may be employed to connect the laser sources within the laser mounts. Further, various securing mechanisms may be employed without departing from the scope and spirit of the present invention, such as a hook and loop system.

The first laser source 204 may be further connected with a laser cap 222. The first laser cap 222 providing a cover for a second end of the first laser source 204 and assisting in preventing unwanted contact with the first laser source 204 or the unwanted accumulation of dust and debris within the first laser source 204. It is contemplated that the first laser cap 222 may be connected to the second end of the first laser source 204 by the fastener 242 engaging through the first laser cap 222. A second laser cap 224 is substantially similar to the first laser cap 222 and may engage with the second laser source 206 in a similar manner as that described for the first laser cap 222. It is further contemplated that the first and second laser caps may be utilized for preventing unwanted movement of the first and second laser sources when connected within the first and second laser mounts. The first and second laser caps may be constructed to contact against a first and second laser cover 218 and 220, respectively. The contact of the laser caps with the first and second laser covers may assist in avoiding unwanted movement of the first and second laser sources during operation of the power tool control system 200.

A first laser cover 218 and a second laser cover 220 are constructed to connect with the first and second laser mounts. The connection allows for the first and second laser sources to be mounted within the first and second laser mounts and then protected from the outside environment by the first and second laser cover 218 and 220. Thus, the laser covers may assist in avoiding unwanted environmental contamination of the laser sources. It is contemplated that the interior surface of the first and second laser cover 218 and 220 may be variously configured. For example, the laser covers may include a protrusion for contacting against the first and second laser caps, as described previously. Alternatively, the interior surface of the first and second laser covers may include contouring for promoting the secure positioning of the first and second laser sources within the first and second laser mounts.

In the current embodiment, the first laser cover 218 includes a first cover receiver 219 and a second cover receiver 221 and the second laser cover 220 includes a first cover receiver 223 and a second cover receiver 225. The first and second cover receivers on both the first and second laser covers are connected with the first and second laser mounts, respectively, through the use of fasteners. The first laser cover 218 is connected by a first threaded bolt 234 and a second threaded bolt 236 which engage through the first and second cover receiver 219 and 221, respectively, with the first laser mount 214. In a preferred, embodiment, the first laser mount 214 includes two threaded receivers which connect with the fasteners 234 and 236. The second laser cover 220 is connected by a first threaded bolt 238 and a second threaded bolt 240 which engage through the first and second cover receiver 223 and 225, respectively, with the second laser mount 216. In a preferred embodiment, the second laser mount 216 includes two threaded receivers which connect with the fasteners 238 and 240.

It is contemplated that various alternative fasteners, such as clips, pins, screws, and the like which are capable of securing the connection of the laser covers with the laser mounts may be employed. Further, various alternative mechanical connection mechanisms may be employed. For example, the laser covers may connect with the laser mounts utilizing a snap fit mechanism, compression lock mechanism, spring loaded lock mechanism, and the like which are capable of securing the connection of the laser covers with the laser mounts.

The casing 202 includes a top side 246 and a bottom side 248. In a preferred embodiment, the bottom side 248 is connected with a casing cover 226. The casing cover is connected via the use of multiple fasteners, such as threaded bolts which engage through apertures in the casing cover 226 with threaded receivers disposed internally within the casing 202. The number and location of the apertures through the casing cover 226 and receivers within the casing 202 may vary as contemplated by one of ordinary skill in the art in order to provide a secure connection.

The first laser source 204 emits a first laser beam 205 and the second laser source 206 emits a second laser beam 207. The electromagnetic radiation used to create the lasers may vary, such as ultra-violet radiation, x-ray radiation, infrared radiation, and the like. In a preferred embodiment, the first and second laser beam 205 and 207 are emitted at an incident angle relative to a horizontal plane established by the connection of the casing 202 with the bench column 110. The incident angle of the laser beams provides a reflectance, from the bench assembly connected with the bench column or from a work piece seated upon the bench assembly, which promotes the capture of the reflected laser beam in order to make operational setting determinations for the drill press. The capture of the reflected laser beams may occur through the use of various electromagnetic radiation detection devices. The positioning of these electromagnetic radiation detection devices may occur in various locations upon the drill press or in locations, which are remote from the drill press.

It is further contemplated that the incident angle established for the first and second laser beams may be relative to various other component features of the power tool control system 200 and/or the drill press 100. The first laser mount 214 includes a first laser outlet 215 and the second laser mount 216 includes a second laser outlet 217. The first and second laser outlet 215 and 217 allow for the first and second emitted laser beams from the first and second laser sources to travel from the location of the laser mounts to an outside environment. In the current embodiment, the first and second laser outlets are constructed as slots which provide an aperture through which the laser beams may travel. It is contemplated that the first and second laser outlets may further include a lens, a photomultiplier, a mirror assembly, and the like which may provide various laser capabilities to the user of the power tool control system.

In a preferred embodiment, the first and second laser beams emitted establish light lines which are within the visible spectrum of light. For example, the first and second laser beams may emit fan beams which establish a visible line of light on a surface, such as the bench 300. In an alternative embodiment, the laser beams emitted are not within the visible spectrum of light. However, it is contemplated that the laser sources may include various devices, such as light emitting diodes (LED), which provide a light within the visible spectrum and tracks the location of the emitted laser beam.

As previously mentioned, the laser beams may provide visible or invisible patterns of light at various incident angles relative to various planar surfaces of the drill press 100. It is further contemplated that the incident angle of the laser beams may be adjusted by a laser beam adjustment mechanism. In a preferred embodiment, the laser beam adjustment mechanism utilizes various reflector devices, which provide a mechanism by which the angle of travel of the laser beam(s) may be determined/adjusted by a user. The reflector devices and other similar devices providing the re-direction capability of the laser beam adjustment mechanism may be included within the laser source, laser mounts, and/or casing of the power tool control system 200 without departing from the scope and spirit of the present invention.

It is contemplated that the power tool control system 200 allows for the incident angle of the emitted laser beams to be adjusted by the user through engagement with a laser source adjustment mechanism. The following description given for the first laser source 204 within the first laser mount 214 is applicable to the second laser source 206 within the second laser mount 216. In a preferred embodiment, the laser source adjustment mechanism utilizes the fasteners used to secure the connection of the laser sources with the laser mounts. For example, through adjustment of the fastener 242, the angle that the laser source 204 is seated within the first laser mount 214 is affected. The fastener 242 may be threaded into the receiver within the first laser mount 214 to varying depths such that the deeper the threading the more the fastener 242 engages against and influences the orientation of the laser source receiver 209. As the laser source receiver 209 is pulled down it rotates the end of the laser source 204, with which it is connected, down which alters the angle of the end of the laser source from which the laser beam is emitted. In the alternative, as the fastener 242 is unthreaded from the receiver within the first laser mount rotation upwards of the laser source receiver 209 occurs thereby causing rotation of the laser source itself, again affecting the angle of the end of the laser source from which the laser beam is emitted.

In alternative embodiments, the laser source adjustment mechanisms may utilize various fastener devices and/or mechanical connection mechanisms to adjustably connect the first and second laser sources within the first and second laser mounts, respectively. For example, the laser sources may connect with the laser mounts via a compression lock mechanism, a snap fit mechanism, spring lock mechanism, and the like which are capable of securing the connection of the laser covers with the laser mounts. It is contemplated that various alternative fasteners, such as clips, pins, screws, and the like which are capable of securing the connection of the laser covers with the laser mounts may be employed. These various fastener/connection mechanisms may allow the position of the laser source to be adjusted within the laser mount. The adjustment results in an angular displacement of the laser source and a change in the angle of incidence of the emitted laser beam. Thus, a user of the present invention is able to determine the incident angle of the laser beam through use of the laser source adjustment mechanism which allows the user to determine the angular position of the laser source.

The laser source adjustment mechanism may be constructed to allow for various mechanical devices, such as a screwdriver, wrench, and the like for adjusting of the position of a laser source. For example, a spanner wrench may connect with recesses on the casing 202 for adjusting the position of the laser sourc. The casing 202 may be disposed with one or more mechanical connection components to allow for the adjustment of the first and second laser sources. In the alternative, the laser source adjustment mechanism may allow for the adjustment of the laser sources through manual manipulation. For example, the user may remove the laser covers and manually contact the laser sources, thereby, adjusting them into different positions by pressing or pulling on the laser sources. In the current embodiment, the first laser source 204 includes a tab 260 and the second laser source 206 includes a tab 262. A user may engage against the tabs in order to position the laser sources. It is further contemplated that the tabs may be engaged by the user in order to insert and/or remove the laser sources from their connection/seating within the laser mounts. Preferably, the laser sources are removable to permit easy repair and/or replacement, this may allow for retro-fitting of various secondary laser sources within the laser mounts. This may extend the useful lifespan of the drill press 100 and the power tool control system 200.

A laser mount adjustment mechanism allows for the direction of the emitted laser beams, from both the first and second laser sources, to be varied by rotating the first and second laser mount 214 and 216 when seated within the first casing receiver 210 and the second casing receiver 212, respectively. The first and second laser mounts are inserted at least partially into the first and second casing receivers, such that the first and second laser covers are connected with the first and second laser mounts. It is contemplated that the inner diameter of the first and second casing receivers may include a ledge or seat which provides a circumferential protrusion upon which the first and second laser mounts and covers may rest. For instance, the first and second laser covers may insert into the first and second casing receivers until they contact the ledge or seat. Thus, the first and second laser sources are positioned within the casing 202 and allowed to rotate through rotation of the laser covers connected with the laser mounts.

In an embodiment, the laser mount adjustment mechanism allows for the rotation of the laser source by engagement of the user with the laser covers. The laser covers include the first and second cover receivers, which allow for a wrench, such as a spanner wrench, to rotate the laser sources. The rotational capabilities may be provided through a connection of various mechanical devices, such as wrenches, clamps, screwdrivers, and the like which may engage with the laser covers and allow a user to rotate the laser sources by rotating the laser covers connected with the laser mounts.

In the current embodiment, the laser mount adjustment mechanism includes a first and second grip regions disposed upon the first and second laser mounts. The first laser mount 214 includes a first grip region 272. The first grip region 272 disposed along a bottom end 271 end of the first laser mount 214. The first grip region 272 constructed with a series of raised ridges for engagement by a user. The first grip region 272 is part of the first laser mount 214, which is accessible by the user during the operation of the power tool control system 200. The first grip region 272 allows a user to grip and rotate the first laser mount 214, thereby, rotating the first laser source 204. The second laser mount 216 is preferably constructed in a similar manner, providing a second grip region 274 accessible to the user.

It is contemplated that the first and second grip regions may be variously constructed to include different contouring for grasping by a user. For example, the number and spacing of raised ridges may be changed to promote a secure grasping by the user. It is further contemplated that the first and second grip regions may be constructed with tab or lever mechanisms which may be engaged by a user for the rotation of the first and second laser sources. The tab or lever may be integral with or removable from the first and second grip regions of the first and second laser mounts. In a still further alternative embodiment, various mechanical connector mechanisms may be constructed upon the first and second grip regions for rotation of the first and second laser mounts. For example, a first and second receiver for receiving a spanner wrench may be included on the grip regions, whereby, with the spanner wrench engaged in the receivers a user may rotate the laser mounts. Those of ordinary skill in the art will appreciate that other mechanisms and devices may be employed for the rotation of the laser mounts without departing from the scope and spirit of the present invention.

The laser mount adjustment mechanism may further include an indexing feature which provides predetermined stops for the rotational movement of the laser mounts. For example, stops may be included at various offset positions as contemplated by those of ordinary skill in the art. It is further contemplated that a rotational indicator system may be disposed upon the casing 202, in proximal relation to the first and/or second receiver position, which provides a user a visual indication of the position of the laser mounts as established through use of the laser mount adjustment mechanism.

Figure 8:
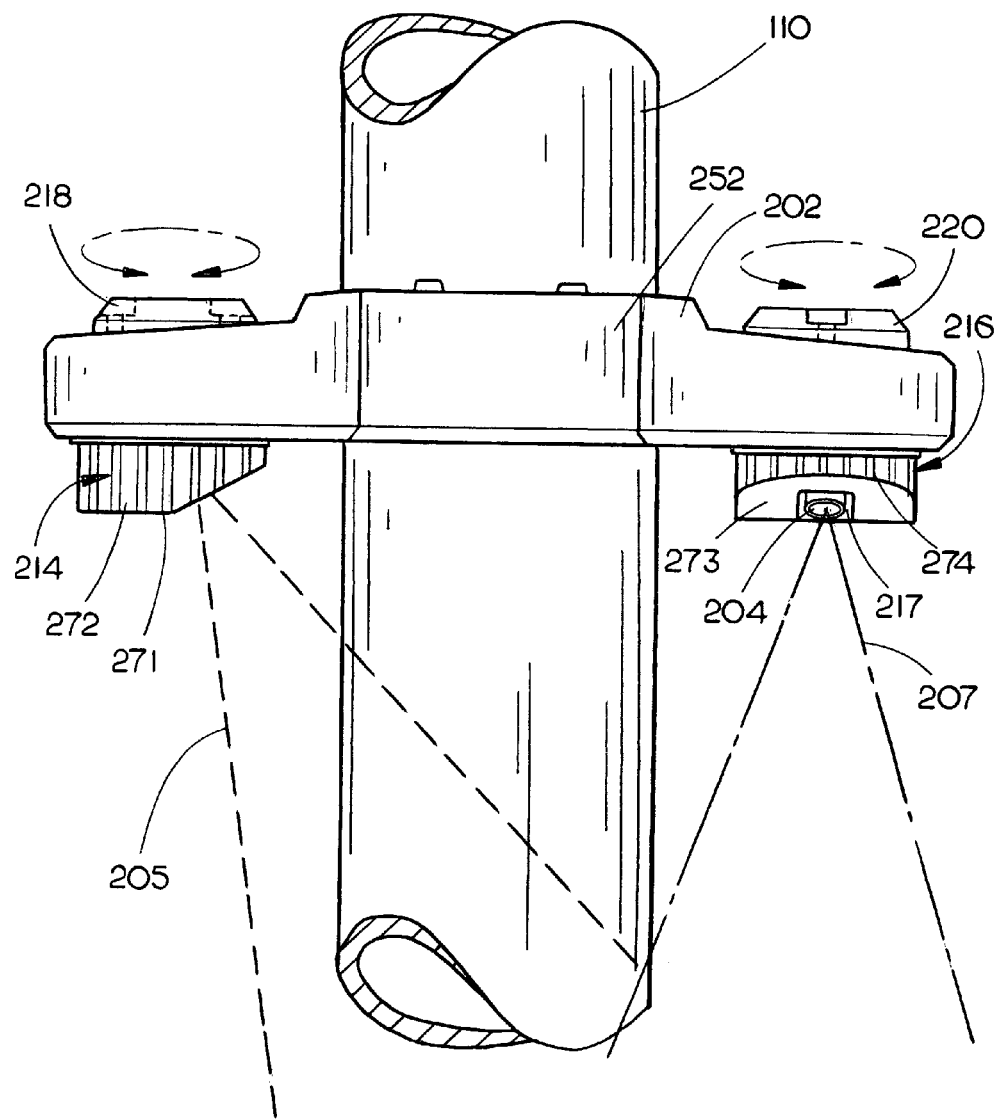
FIG. 8 is a front plan view illustrating the first and second laser sources emitting a first and second laser beam, respectively, the first and second laser beams being emitted in different direction due to the adjustability of the first and second laser mounts.
Figure 9:
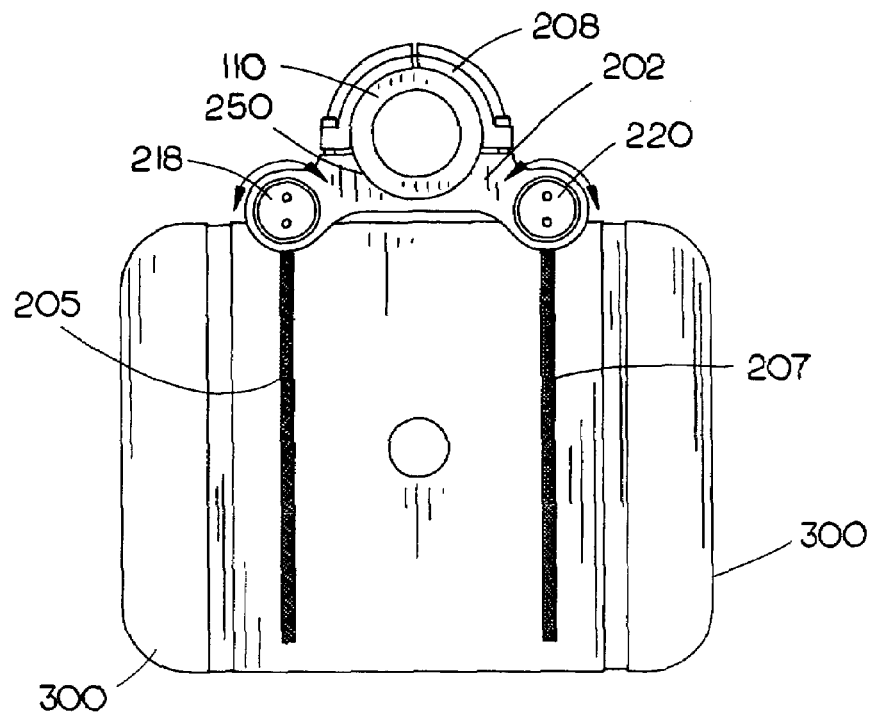
FIG. 9 is an illustration of the first and second laser beams providing a parallel line pattern on a bench of the drill press.
Figure 10:
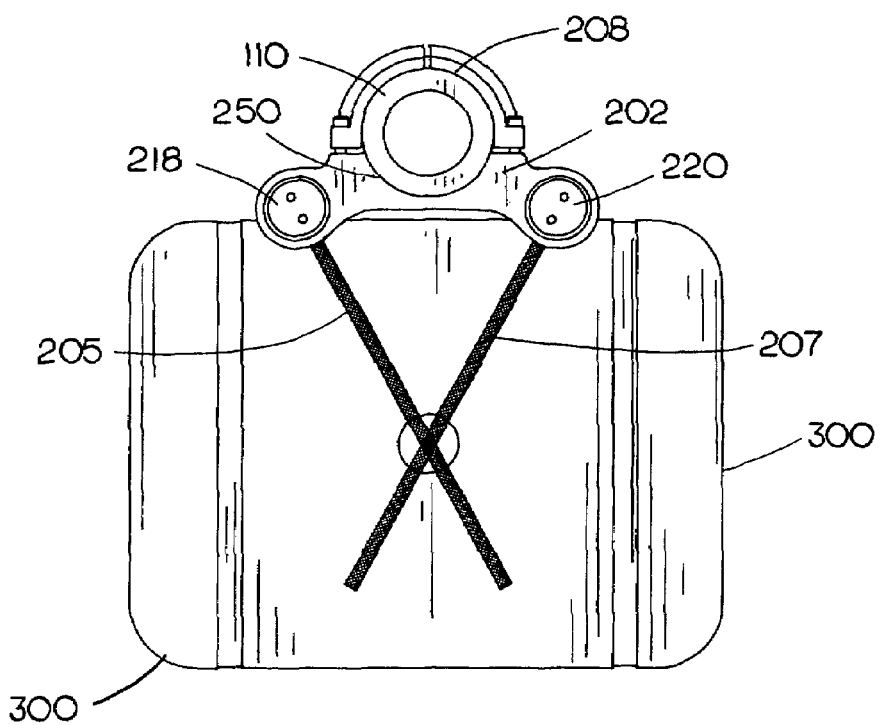
FIG. 10 is an illustration of the first and second laser beams providing a cross-hairs pattern on the bench of the drill press

In a preferred embodiment, the first and second laser mount 214 and 216 are allowed to rotate three hundred sixty degrees when received within the first and second casing receiver 210 and 212. FIG. 8 shows that the first and second laser source 204 and 206 may be individually positioned such that the first and second laser beam 205 and 207 are emitted in different directions and with different angles of incidence. It is contemplated that the laser mount adjustment mechanism may allow the rotational movement of either of the first or second laser mounts to be linked to one another. For instance, the rotation of the first laser mount 214 may cause the second laser mount 216 to rotate correspondingly. This may occur via a mechanical linkage connecting the first and second laser mounts which extends within or without of the casing 202. The rotational capabilities allowed by the laser mount adjustment mechanism allow the emitted laser beam 205 and 207 to establish various patterns upon a surface, such as the bench 300. FIGS. 9 and 10 illustrate the effect of rotation of the laser mounts upon the pattern the laser beams establish upon the bench 300. In FIG. 9 the laser mounts are rotated such that the laser beams emit two parallel lines upon the bench 300. This pattern may assist in the indexing of a workpiece upon the bench 300 or other functions as contemplated by those of skill in the art. In FIG. 10, the laser beams establish a cross-hairs pattern, placing the intersection point under the axis of operation of the drill bit 124. Thus, when a user places a workpiece upon the bench 300, the laser beams establish their intersection pattern upon the workpiece in the location which the drill bit may at least partially bore through the workpiece.

In a further alternative embodiment, the laser mount adjustment mechanism may allow for the rotation of the first and second laser mount 214 and 216 via an automatic mechanical system. For example, the user interface 150 may include a capability which allows the user, by selection of certain functions provided by the user interface 150, to rotate the laser mounts. The automatic rotation capabilities may provide a continuous rotation or rotation by pre-determined angles of displacement, from a zero starting point. The zero starting point may be defined as the position of the laser mounts wherein the laser sources emit laser beams which intersect in a cross-hair pattern along the axis of operation of the drill bit 124. It is contemplated that the automatic mechanical system which controls the rotation of the laser mounts may include a secondary user interface separate from that of the user interface 150. The automatic laser mount adjustment mechanism may provide predetermined stops, as previously described, which may be selected by the user.

The casing 202 includes a back edge 250 and a front edge 252. The back edge 250 engages against the bench column 110 when the casing 202 is connected, via fastener 230 and 232, with the bracket 208 about the bench column 110. In the current embodiment, the back edge 250 is concave to mimic the shape of the bench column 110, allowing the back edge 250 to form a generally smooth interface against the bench column 110. The tightening of the fasteners 230 and 232 once inserted through the bracket receivers 282 and 284 and connected via a first casing fastener receiver 276 and a second casing fastener receiver (not shown) to the casing 202 provide for a clamp-type securing of the casing 202 to the bench column 110. The front edge 252 may include a similar concave configuration as that of the back edge 252. It is contemplated that the construction of the front and back edges may provide a roughly symmetrical casing 202. In such an instance, the front edge may include casing fastener receivers, similar to the back edge 252, thereby, enabling the casing 202 to be connected with the bracket 208 about the bench column 110 against the front and back edges of the casing 202. In the alternative, the construction of the front and back edges may be dissimilar providing the casing 202 with unique edge surfaces.

The bracket 208 connection with the casing 202 allows the power tool control system 200 to be connected with the bench column 110 in various locations. In a preferred embodiment, the power tool control system is disposed a pre-determined height above the bench 300 which assists in optimizing the performance of the laser beams being emitted from the first and second laser source 204 and 206. It is to be understood that the positioning of the power tool control system 200 along the bench column 110 may vary as contemplated by those of ordinary skill in the art to assist in optimizing the performance of the power tool control system 200.

It is further contemplated that a casing adjustment mechanism may provide the connection of the casing 202 with the bench column 110. The casing adjustment mechanism may allow for the casing 202 to be adjusted along the rack 111 of the bench column 110. The casing adjustment mechanism may comprise a pinion for engaging with the rack 111. The pinion may be disposed within the casing 202 and connected, externally to the casing 202, with a rotation device, such as a knob or handle. In operation the user may engage with the rotation device in order to rotate the pinion, thereby, adjusting the pinion's position relative to the rack 111 which causes the position of the casing 202 to be adjusted. Alternatively, the casing adjustment mechanism may provide an automatic adjustment capability, whereby a user may adjust the position of the casing 202 through use of the user interface (control panel) 150. Various mechanical mechanisms may be employed to provide the adjustment capabilities of the casing adjustment mechanism as may be contemplated by those of ordinary skill in the art.

In alternative embodiments, the casing 202 may be connected with the head assembly 102. For instance, the casing adjustment mechanism may provide for the connection of the casing 202 with the head assembly 102. It is contemplated that the casing adjustment mechanism may be variously located in its connection with the head assembly 102. For instance, in a first embodiment the casing 202 may be proximally disposed near the bench column 110 behind the quill assembly 120 and in a second embodiment the casing 202 may be connected in front of the quill assembly 120 proximal to the user interface (control panel) 150.

The first and second laser beam 205 and 207 emit a patter which configured to provide a user of the drill press 100 a visual representation of the location of the axis of operation of the drill bit 124. This capability may be altered, as previously described, to provide an indexing functionality or various other functionalities as contemplated by those of ordinary skill in the art.

Figure 11:
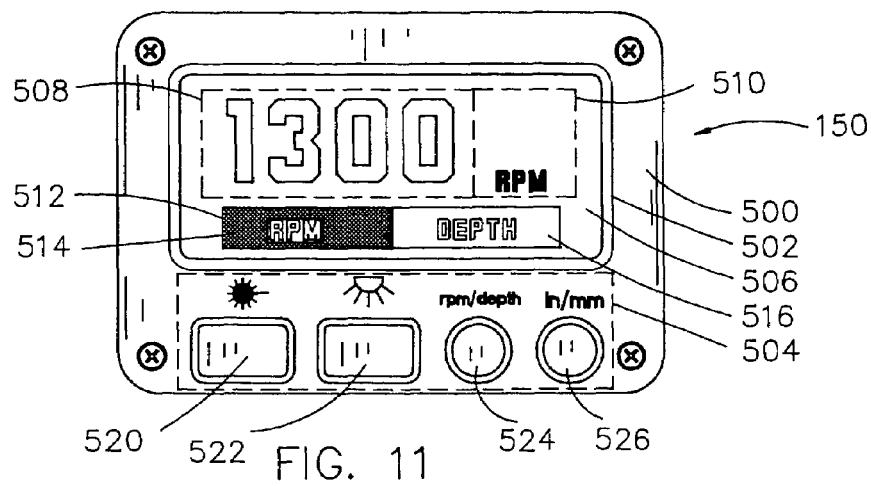
FIGS. 11, 12, and 13 illustrate a first exemplary embodiment of a user interface of the power tool control system and further illustrate some of the different functional capabilities of the user interface.
Figure 12:
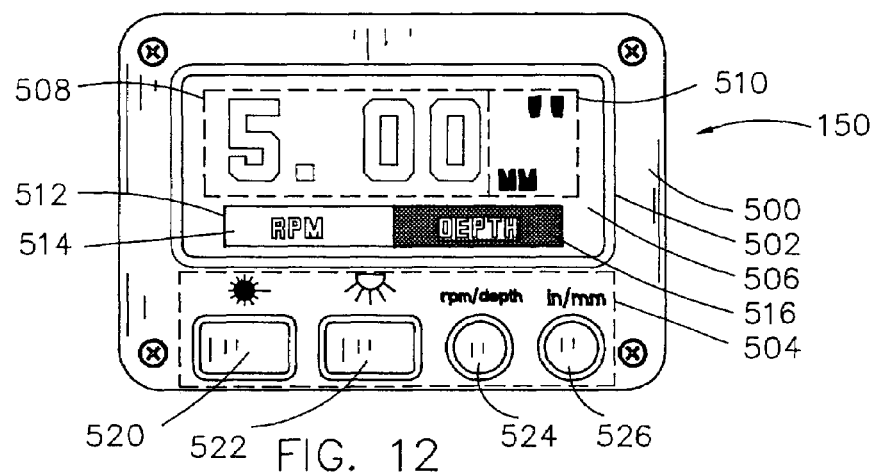
Figure 13:
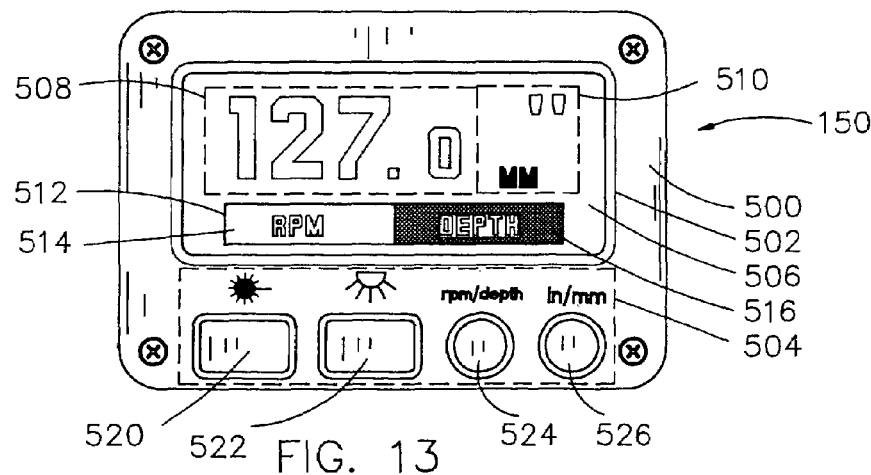

FIGS. 11, 12, and 13 illustrate an exemplary embodiment of the user interface (control panel) 150 including various component features of the control panel 150. A housing 500 includes a display 502 and a selector assembly 504 for providing operational control over the functioning of the drill press. In a preferred embodiment, the display 502 includes a display screen 506. In the preferred embodiment, the display screen 506 is a liquid crystal display (LCD) screen. However, alternate display screen technologies may be employed without departing from the scope and spirit of the present invention. The display screen 506 provides a visually identifiable representation of various information relevant to the operation of the drill press 100. The display screen 506 may include one or more screen regions which have the operational effect of dividing the display screen into discrete regions. These discrete regions may be enabled to display the relevant information for the operation of the drill press. In the current examples shown in FIGS. 11-13, the display screen 506 may be enabled with a first discrete region 508 which provides the readout information. The readout information includes the "1300" for identifying the rpm, the "5.00" for identifying a standard measurement system (US Customary System), and the "127.0" for identifying a metric measurement. In a second discrete region 510 the standard being employed in conjunction with the readout information may be identified, such as the "rpm", "mm", and the inches symbol (").

In a third discrete region 512 of the display screen 506, a visual identifier may be enabled to provide the user with confirmation of the type of readout information that is going to be provided. In the current embodiment, the third region 512 may be further sub-divided into a first cell 514 and a second cell 516. The first cell 514 includes an "RPM" indicator and the second cell 516 includes a "DEPTH" indicator. Thus, the user of the drill press may be assisted in readily ascertaining the type of information they are going to be provided.

The selector assembly 504 of the control panel 150, in the current embodiment, comprises a first selector 520, a second selector 522, a third selector 524, and a fourth selector 526. These selectors may be enabled using various technologies. In the current embodiment, the selectors are push buttons, which enable a specific functionality. The functionality of the selectors is established by a symbol located in close proximity to the selector. For example, the first selector 520 has a "*" with a tail disposed above it on the housing of the control panel. This selector may, preferably, be enabled to turn on and off the drill press 100 including the power tool control system 200, which enables the functionality of the laser beams. The second selector 522 has a semi-circle (half sun) with rays disposed above it on the housing. This selector may, preferably, be enabled to turn on and off a light, which provides illumination to the drill press 100. The third selector 524 has "rpm/depth" disposed above it on the housing. Thus, this selector may enable the user to toggle between the "RPM" functionality and the "DEPTH" functionality. The fourth selector 526 has "in/mm" disposed above it on the housing. This selector may enable the user to select between providing measurements in inches or in a metric format.

It is contemplated that various other component features may be included with the user interface (control panel) 150 of the present invention. In FIGS. 14, 15, and 16 a second exemplary embodiment of a user interface (control panel) 600 is shown. The control panel 600 includes a housing 602 disposed with a selector assembly 604 and a display 606. The display 606 includes a display screen 608. The display screen 608 is divided into discrete regions 610, 612, 614, 616, 618, 620. The division into regions may include further divisions into sub-regions (i.e., cells) such as those described above. The information contained within the regions on the screen may vary to provide readout information as previously described. The selector assembly is enabled with four push button selectors 622, 624, 626, and 628, similar to the push button selectors described above. In the current embodiment, the push buttons have symbols disposed above them on the housing but the buttons also vertically align with symbols displayed within regions on the display screen 608. This enables a visual identifier to be presented on the display screen 608 to provide the user with information as to the status of the user interface/control panel 600 enabled by the selector. One of the selector has "units" disposed above it on the housing. Then, in vertical alignment with the selector, on the display screen 606 in region 614 it is shown that through the use of this selector the user may select between various types of units to be displayed, such as "frac", "dec", and "mm". It is understood that while in the present embodiment, all three unit types are shown on the display screen, in operation as the selector is operated upon by the user that the various unit types may individually be displayed as selected. Another of the selectors has a "zero" disposed above it on the housing. This selector may enable an operator to zero out or reset the display screen. This may be advantageous when the user wishes to change the operation being monitored by the control panel. The selector 624 has a light symbol displayed above it on the housing and in vertical alignment on the display screen 608 in section 618 is a light symbol. The selector 622 has a power symbol displayed above it on the housing and in vertical alignment of the display screen 608 in section 620 is a power symbol.

In another exemplary embodiment, shown in FIGS. 17 through 20, a user interface (control panel) 150 is provided. The user interface (control panel) 700 includes a housing 702 including a selector assembly 704 and a display 706. The display 706 includes a display screen 708 which is divided into discrete regions 710, 712, 714, 716, 718, and 720. The display screen 708 is similar to display screens 506 and 608 described previously. The selector assembly 704 includes five selectors 722, 724, 726, 728, and 730. The selector assembly 704 may be similar in all respects to the selector assembly 604. However, in the current embodiment selector assembly 704 includes the fifth selector 730 as a push button disposed with an "rpm/depth" above it on the housing. As described previously, this enables a user of the drill press to select between a display of the rpm of the drill or the depth of boring of the drill. Again, the display screen 708 is enabled with an "rpm" and "depth" display in vertical alignment with the selector in region 718. It is understood that the display may present either a display of rpm or depth, as determined by the selection of the user.

The display screens 506, 608, and 708 may display the "rpm", "mm", and inches symbol (") in various locations about the display screen. In FIGS. 11 through 20 these symbols are generally displayed along the right side of the display screen. It is contemplated that these symbols, as well as the various other information displayed on the display screen may be positioned in various locations upon the display screen. As such, the discrete regions of the display screen may be alternatively configured to provide the various information in different formats. This may be advantageous in order to customize the control panel for use, which may appeal to the users of the drill press and control panel of the present invention.

The housing 502, 602, and 702 are constructed to include four receivers through which fasteners, such as threaded bolts, may be inserted. It is to be understood that the threaded bolts engaged through the housing and into the head assembly 102 of the drill press 100 by connecting with receivers disposed in the head assembly in the location for mounting the user interface/control panel 150, 600, and 700. It is contemplated that various fasteners, such as pins, screws, clips, clamps, and the like may be used to secure the user interface/control panel in connection with the drill press 100. It is further contemplated that the connection of the user interface/control panel with the head assembly 102 of the drill press 100 may be accomplished utilizing various mechanical connection mechanisms, such as a loop and hook mechanism, a compression lock mechanism, a snap fit mechanism, a friction fit mechanism, and the like for securing the user interface/control panel to the drill press. Alternative connection mechanisms and/or fastener systems may be utilized without departing from the scope and spirit of the present invention.

It is contemplated that a casing adjustment mechanism may connect the first and second laser mount 214 and 216 with the casing 202. The adjustment mechanism may allow for the adjustment of the laser mounts in a vertical and horizontal direction relative to the casing 202. The adjustment mechanism may be variously constructed as contemplated by those of ordinary skill in the art. For example, the adjustment mechanism may provide an adjustment member, which connects on a first end with the laser mount and includes a second end for inserting within an adjustment receiver of the casing 202. The adjustment member may be allowed to slidably adjust within the adjustment receiver of the casing 202, thereby providing the horizontal movement. The adjustment member may further include a hinge joint between the first and second ends of the adjustment member. The hinge joint may allow the first end to be adjusted in a vertical plane relative to the second end, thereby allowing the laser mount to be adjusted in the vertical plane. It is contemplated that one or both laser mounts of the power tool control system 200 may be connected with the adjustment mechanism and that the casing 202 is constructed to allow this connection.

The power tool control system 200 may employ various numbers of laser sources for the emission of various numbers of laser beams. For example, the power tool control system 200 may include a first, a second, and a third laser source. The three source power tool control system emitting three laser beams which may provide a triangulation positioning system for the drill press 100. The casing 202 may be variously configured to include the various number of laser sources. Alternatively, two or more casings may be connected with the drill press in order to provide the power tool control system. The location with which two or more casings may connect with the drill press may vary. For instance, a first casing may connect with the bench column, as shown, and the second casing may connect with a bottom side of the head assembly. Further the position along the bottom side of the head assembly may vary. In one embodiment, the casing may connect along the bottom side in a position behind the quill assembly and drill bit, when the drill press is viewed from a front side of the head assembly (the front side being that side disposed with the user interface). In an alternative embodiment, the casing may connect on the bottom side in a position in front of the quill assembly and drill bit, when the drill press is viewed from the front side.

It is further contemplated that the number of laser sources connected within the laser mounts may vary. For example, the first laser mount 214 may be connected with a first and a second laser source. The first laser outlet 215 may be constructed for the emission of a first and second laser beam from the first and second laser sources. The number of laser sources connected with the first and second laser mounts may also vary. For instance, the first laser mount 214 may include two laser sources and the second laser mount 216 may include one laser source. Various other configurations of the number and location of laser sources employed with the power tool control system 200 may be utilized as contemplated by those of ordinary skill in the art.

Figure 21:
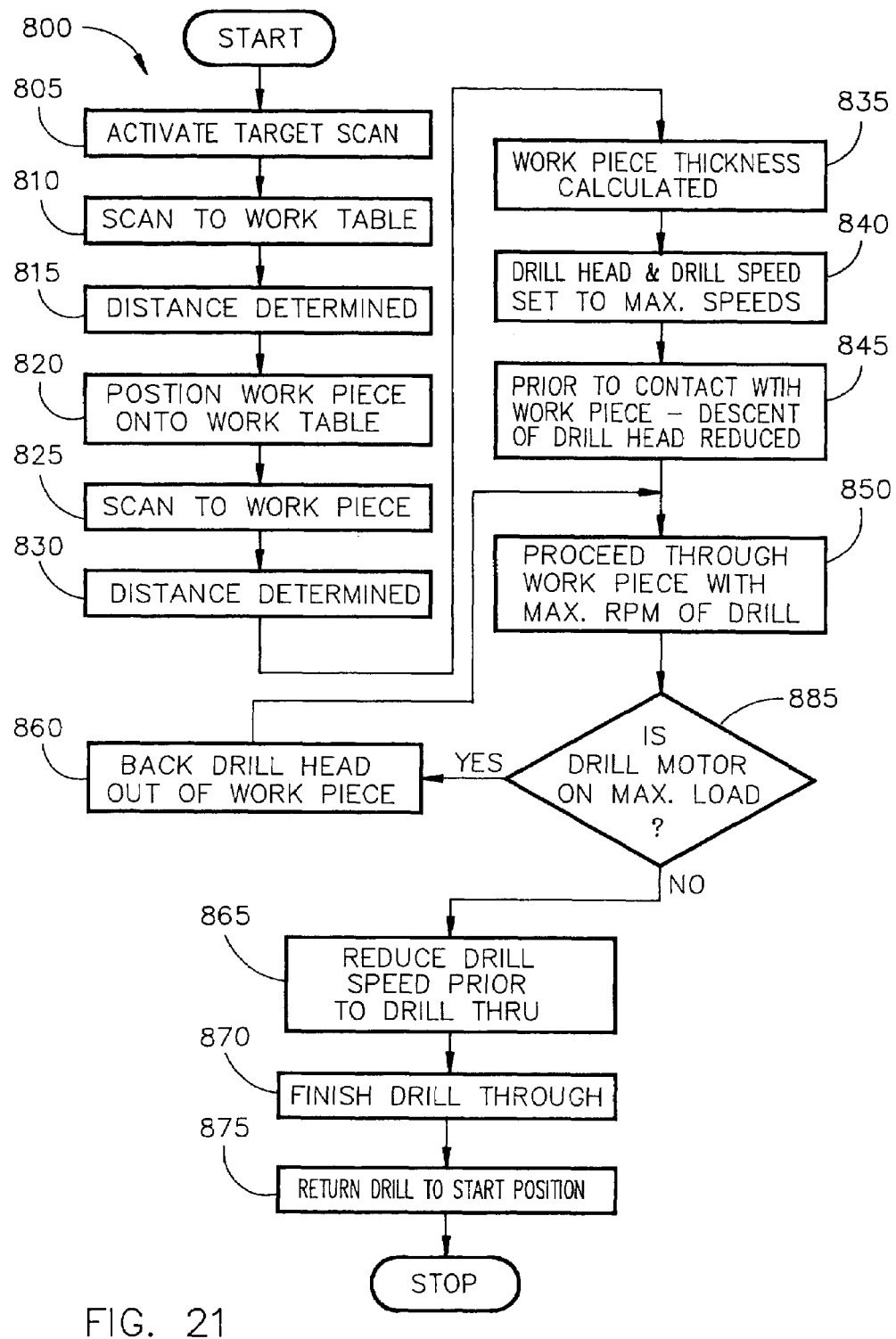
FIG. 21 is a block diagram illustrating a method of operating a drill press including a power tool control system in accordance with an exemplary embodiment of the present invention.

Referring now to FIG. 21, a method 800 for operation of the drill press 100 utilizing a power tool control system 200, is shown. In a first step 805 the power tool control system 200 is activated. The activation of the power tool control system 200 results in the first and second laser source 204 and 206 emitting the first and second laser beam 205 and 207. In step 810 the first and second laser beams are emitted for contacting the bench 300. It is contemplated that various bench devices may be employed and that the power tool control system 200 may be positioned to emit one or more laser beams for contacting the bench devices. In step 815 the distance to the bench 300 is determined. The determined distance from step 815 may be recorded/saved by the user interface 150 or manually recorded by the user of the drill press 100. In the next step 820, a workpiece is positioned on the bench 300.

With the workpiece positioned on the bench 300, in step 825, the power tool control system 200 emits the first and second laser beam 205 and 207. The laser beams contact the workpiece positioned on the bench and in step 830 the distance to the workpiece is determined. The distance to the workpiece may also be recorded/saved by the user interface 150 or manually recorded by the user of the drill press 100. In step 835 the thickness of the workpiece is calculated. The thickness of the workpiece may be determined by the user interface 150 which is capable of calculating the difference in values between the distance to the bench 300 and the distance to the workpiece positioned on the bench 300. In the alternative, the user of the drill press 100 may manually calculate the workpiece thickness utilizing the same mathematical principle described above, that being the subtraction of the determined value for distance to the workpiece on the bench 300 from the determined value for distance to the bench 300.

Utilizing the determined workpiece thickness, in step 840 the drill bit 124 is set to a proper speed. The proper speed being the maximum revolutions per minute of the drill bit 124 provided through its connection to the motor 103 via the quill assembly 120 and chuck 122, which optimizes the boring of the workpiece by the drill bit 124. With the drill speed set to the proper speed, the user of the drill press 100, through turning of the crank mechanism 104, may begin the descent of the drill bit 124 towards the workpiece on the bench 300. In step 845, just prior to contact of the drill bit 124 with the workpiece, the user may reduce the speed of descent with which the drill bit 124 is being brought into to contact with workpiece. Through continued operation/rotation of the crank mechanism 104, in step 850 the user proceeds to bore through the workpiece utilizing the drill bit 124 set to proper speed. As the drill bit 124 is boring through the workpiece the user may determine if the motor 103 of the drill press 100 is operating at a maximum load in step 855. If the user determines that the motor 103 is operating at a maximum load then in step 860, the user is able to back out the drill bit 124 from the workpiece. After backing out the drill bit 124 from the workpiece the method of operating the drill press proceeds back to step 835 where the thickness of the workpiece is determined. The motor 103 operating at a maximum load is an indication that the speed set for the drill bit 124, for boring through the workpiece, may be incorrect and that a recalculation of the thickness of the workpiece may assist in providing a more optimal drill speed (rpm). After recalculating the workpiece thickness the user proceeds through the steps of the method as described previously.

If in step 855 it is determined that the motor 103 is not operating at a maximum load, then the user continues to proceed with the boring of the workpiece and to step 865. In step 865, just prior to the drill through by the drill bit 124, the drill speed may be reduced. With the drill speed reduced, the user may finish the drill through of the workpiece by the drill bit 124 in step 870. After the drill through is completed the drill bit 124 is backed out of the workpiece and returned to a starting position in step 875, wherein, the drill bit 124 is removed from contact with the workpiece.

In an alternative embodiment, the present invention determines various other structural factors of the workpiece in order to provide for the proper operational setting of the drill press 100. For instance, the power tool control system may determine the hardness of the workpiece seated upon the work table of the drill press 100. The hardness may be utilized to determine and set the speed of the drill bit 124 for operation upon the workpiece. Other structural factors, such as the moisture content of the workpiece may be used to determine the proper operational settings of the drill press 100 without departing from the scope and spirit of the present invention.

Figure 23:
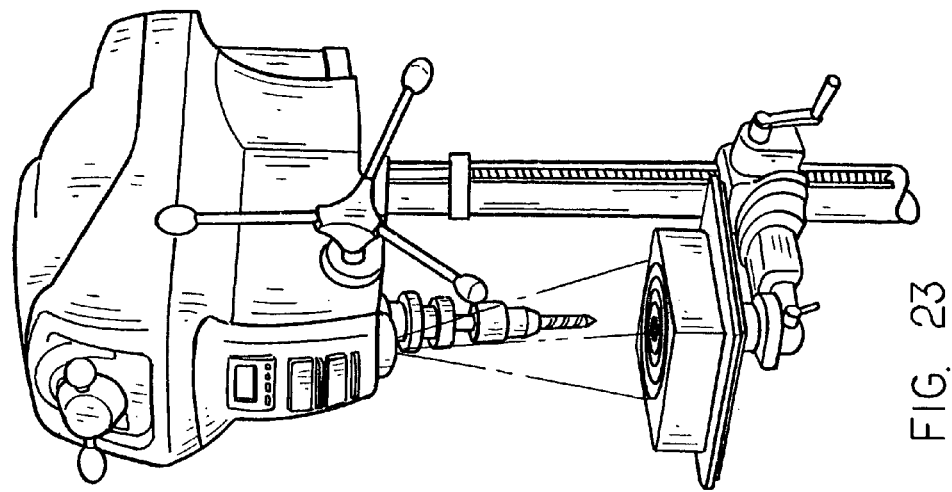
FIG. 23 is an illustration of the power tool control system connected with the drill press of FIG. 22, wherein the emitted laser beam establishes a pattern upon a workpiece seated upon a bench of the drill press.
Figure 22:
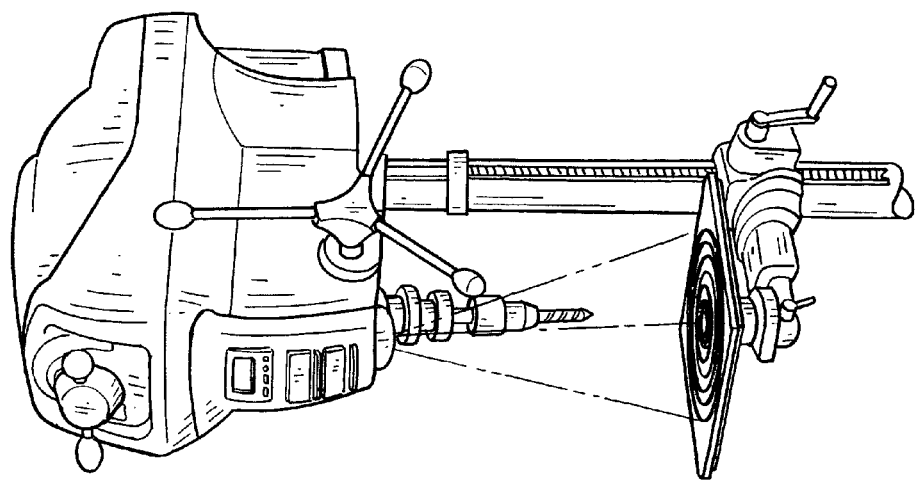
FIG. 22 is an illustration of a power tool control system connected with a drill press, the power tool control system emitting a laser beam for determining operation settings of the drill press and establishing visual indicators for the user of the drill press.

In another alternative embodiment, a power tool control system as shown in FIGS. 22 and 23 is contemplated by the present invention. The drill press may be similar in all respects to drill press 100, however, the power tool control system includes a laser mount for connecting a laser source (laser generator) with a drill press. The laser mount connects in a position on a bottom side of the head assembly proximal to a front side. The laser mount positions the laser source in a position in front of the quill assembly including the drill bit. Thus, the laser source emits a laser beam from the front of the drill bit.

The emitted laser beam may be capable of establishing various patterns and coverage areas. In the current embodiments of FIGS. 22 and 23, the laser beam establishes a pattern of concentric rings with an outer ring having a first diameter and the other rings being within the first diameter and establishing a narrower diameter. The inner most ring has the smallest diameter and is preferably positioned to represent the axis of operation of the drill bit. Alternative patterns, such as cross-hairs, parallel lines, and the like which may indicate the drill bit axis of operation or provide an indexing functionality may be employed as contemplated by those of ordinary skill in the art.

It is contemplated that the laser source utilized for the power tool control system of FIGS. 22 and 23 may be similar in all respects to the first and second laser source 204 and 206, described previously. Alternatively, the laser source for use with the power tool control system of FIGS. 22 and 23 may be constructed to include various mechanisms, such as a photomultiplier, reflectors, dithering assemblies, and the like which may enable the laser source to establish various patterns, such as the concentric ring pattern shown. Further the connection of the laser source within the laser mount may be similar in all respects to that described for the laser source 204 and 206. In the alternative, the laser sources may be integrally connected within the laser mount.

In the current embodiment, the laser mount is connected to the head assembly through the use of threaded bolts which connect with receivers in the head assembly. It is contemplated that various mechanical connection mechanisms, such as a compression lock mechanism, snap fit mechanism, and the like may connect the laser mount with the head assembly. Further, the use of various fasteners, such as screws, clips, pins, and the like may be employed.

The laser mount is constructed to allow for the rotation of at least a section of the laser mount, whereby, the laser source may be rotated and the direction and/or pattern of the laser beam may be adjusted. Further, the laser source may be adjustably mounted within the laser mount allowing for the adjustment of the incident angle with which the laser beam is emitted. The laser mount may further include various lens devices through which the laser beam passes as it travels from the laser source to outside the laser mount. These various lens devices may be constructed to allow for the establishment of various patterns by the laser beam.

It is contemplated that an adjustment mechanism may be included in the connection between the laser mount and the head assembly. The adjustment mechanism may allow the laser mount to be vertically adjusted relative to the head assembly, drill bit, or bench of the drill press. Similar to the power tool control system 200, the power tool control system of FIGS. 22 and 23 may be communicatively coupled to the user interface or may allow for separate operation from the user interface.

The power tool control system shown in FIGS. 22 and 23 may include two or more laser sources connected with the drill press by two or more laser mounts. The location(s) where the laser mount(s) is connected with the drill press may vary. For instance, the laser mount may be connected on the bottom side of the head assembly, but behind the quill assembly and drill bit. With multiple laser mounts and laser sources, one laser mount may be connected in front of the drill bit and another may be connected behind the drill bit. It is further contemplated that the laser mount(s) may be connected via mounting member(s) to the drill press. The mounting member(s) may extend from the drill press a pre-determined distance and provide a position for the laser mount which allows the laser source to emit a laser beam onto the bench or a workpiece disposed on the bench. The mounting member(s) may provide an adjustable functionality, wherein the position of the laser mount may be adjusted in a vertical or horizontal direction relative to the drill press. The mounting member(s) may also connect with the bench column providing a fixed or adjustable position for the laser mounts.

Figure 24:
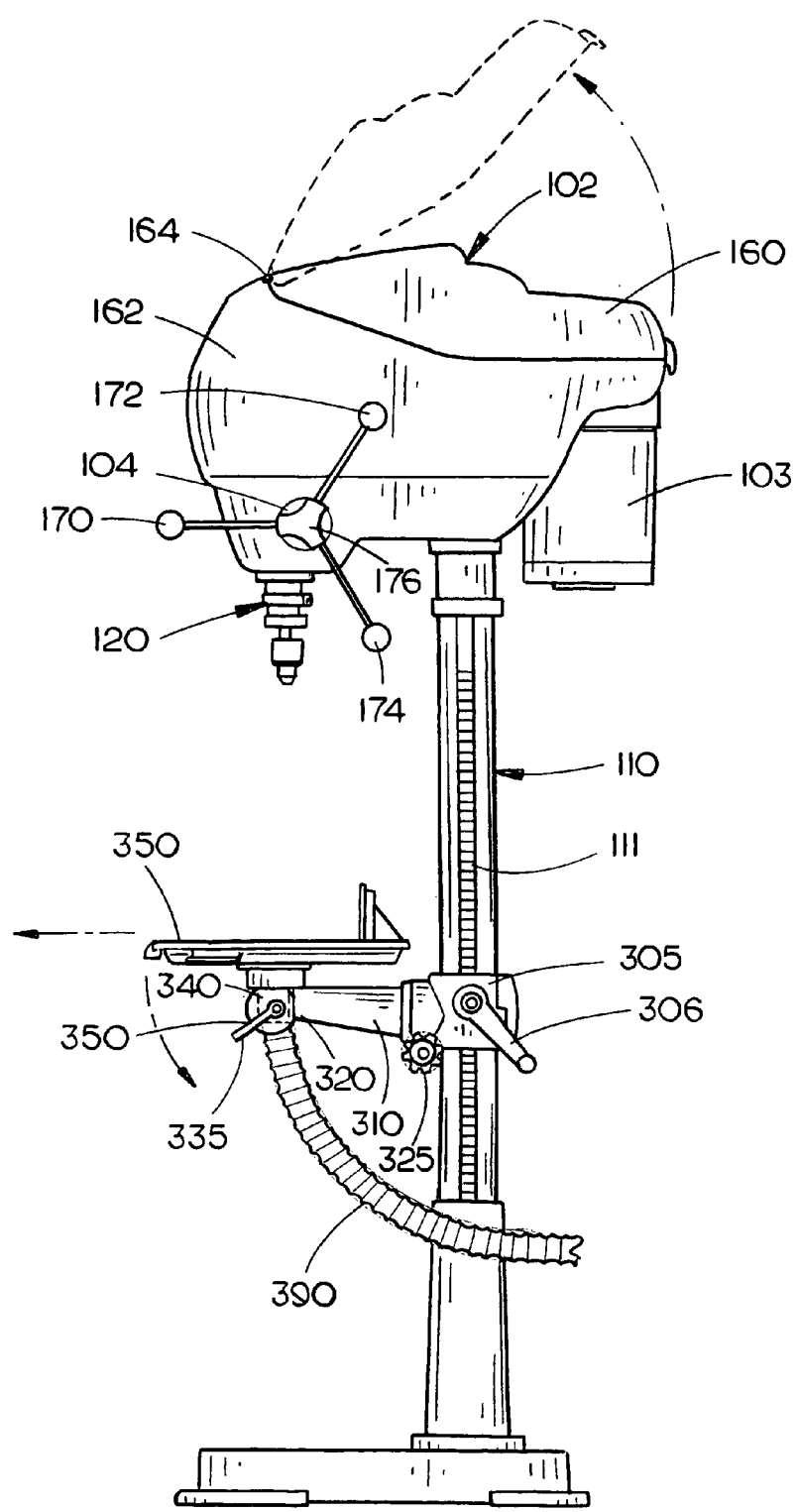
FIG. 24 is an illustration of the drill press of FIG. 1 including the head assembly including an adjustable member and a dust collection system connected with the bench.

It is contemplated that the head assembly 102 may couple with the motor 103 and quill assembly 120 without encompassing either the motor 103 or the quill assembly 120. In one embodiment, the head assembly 102 is a single piece assembly. In a preferred embodiment, the head assembly 102 is constructed as a multi-piece assembly. As shown in FIGS. 1 and 24, the head assembly 102 includes a first section 160 adjustably coupled with a second section 162. The connection between the first and second sections may be a hinge joint 164, which allows the first section 160 to rotate relative to the second section 162. In an alternative embodiment, the first section 160 may be removable from its connection with the second section 162. The use of various fasteners and connection mechanisms which allow the first and second sections to connect in the adjustable or removable manner described above is contemplated. For example, the first and second sections may be connected through the use of pins, screws, bolts, clips, and other fasteners or the sections may be connected through the use of a snap fit mechanism, compression lock mechanism, friction fit mechanism, and the like. The different connections may allow for the first section to be adjustable relative to the second section.

Coupled with the quill assembly 120 is the crank mechanism 104 or feed handle assembly. The feed handle assembly includes a plurality of posts 170, 172, and 174 coupled with a quill hub 176 on one end and a knob on the opposite end, for controlling operation of the drill bit 124. The feed handle assembly extends through the head assembly in establishing operational engagement with the quill assembly 120. It is understood that the feed handle assembly may be an adjustable feed handle assembly allowing a user of the drill press to establish each of the plurality of posts in a variety of lengths. Further, coupled with the head assembly is a variable speed adjustment handle 180. The variable speed adjustment handle 180 allows the user of the drill press 100 to make adjustments to the speed of the drill. The variable speed adjustment handle 180 may be constructed as a continuously variable speed adjustment assembly allowing for speed adjustments throughout operation of the drill press 100.

The head assembly 102 may be enabled as a pivoting assembly. This may allow the user of the drill press 100 to pivot the head assembly 102 up and move the head assembly 102 forward and backwards. It is contemplated that the head assembly 102 may be enabled to be rotationally adjusted. Other hinged assemblies may be employed to provide movement capabilities to the head assembly 102.

Figure 28:
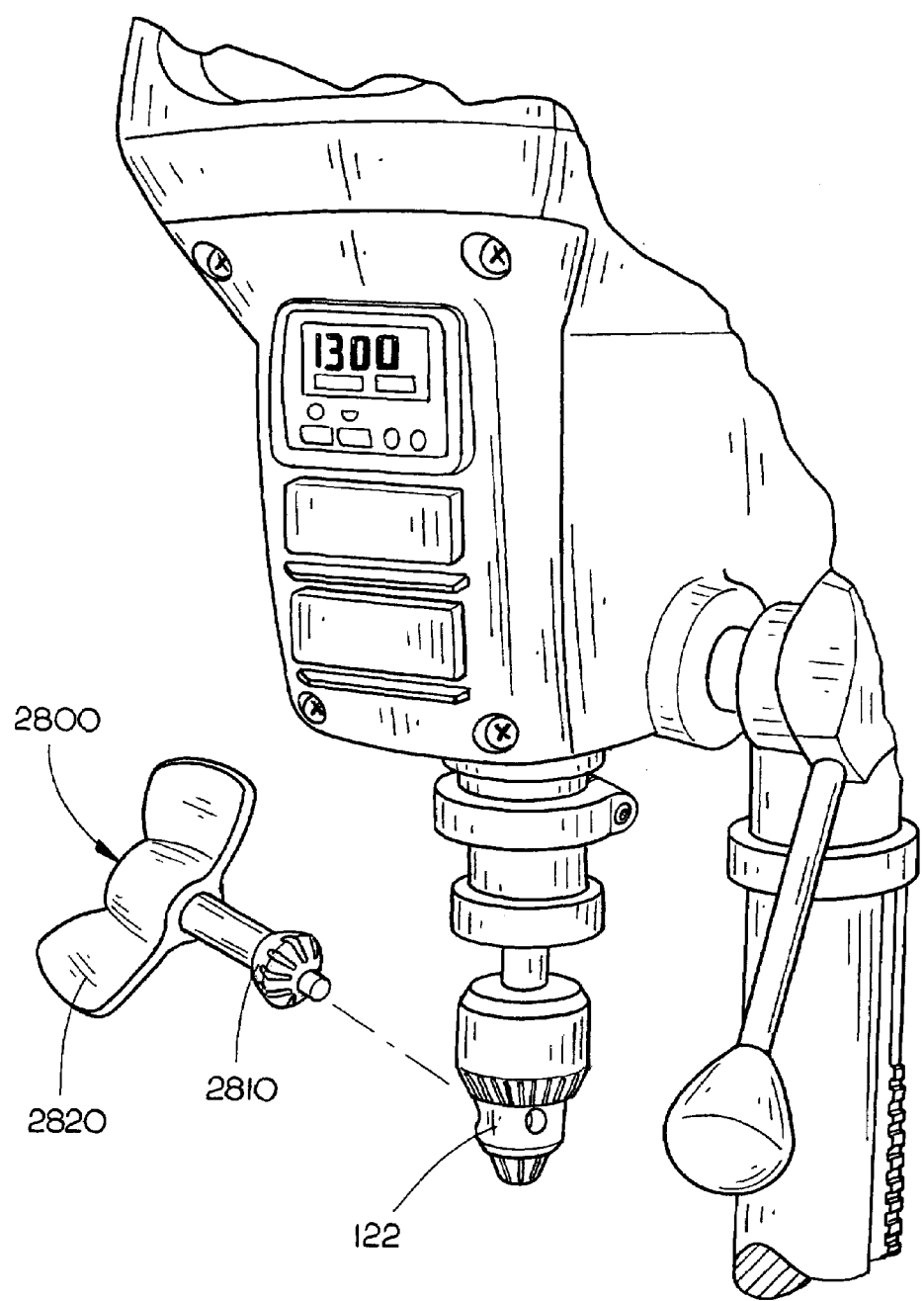
FIG. 28 is an illustration of an ergonomic chuck key assembly, for engaging with a chuck of the drill press, in accordance with an exemplary embodiment of the present invention.

The quill assembly 120 may include a quill lock handle to secure the position of the quill assembly 120 during operation of the drill press. Additionally, the chuck 122 may be engaged by an ergonomic chuck key assembly 2800, as shown in FIG. 28. The ergonomic chuck key assembly 2800 includes a standard chuck key 2810 connected with an ergonomically configured chuck handle 2820. The ergonomically configured chuck handle 2820 may be configured in various forms, such as a "T" shaped handle, or other contoured handle configuration as may be contemplated by those of ordinary skill in the art. The ergonomically configured chuck handle 2820 may be composed of various materials, such as metal, plastic, wood, composite, and the like.

The head assembly 102, including the motor 103 and quill assembly 120, is coupled with the top end 112 of the bench column 110. The bench column 110 being a post established at a particular height for enabling operation of the drill press 100 of the present invention. The height of the post may vary to accommodate a variety of configurations as contemplated by those of ordinary skill. Further, it is contemplated that the post is of a generally tubular shape of uniform diameter and thickness of material. However, in alternative embodiments, the shape of the bench column 110 may be square, rectangular, polygonal, or other geometric configurations as contemplated. Additionally, the dimensions may vary, for example a bottom end may be wider than the top end of the bench column 110 or a middle region may be thinner than both ends. Also, the thickness and composition of the material employed to form the bench column 110 may vary as contemplated by one of ordinary skill.

Figure 29:
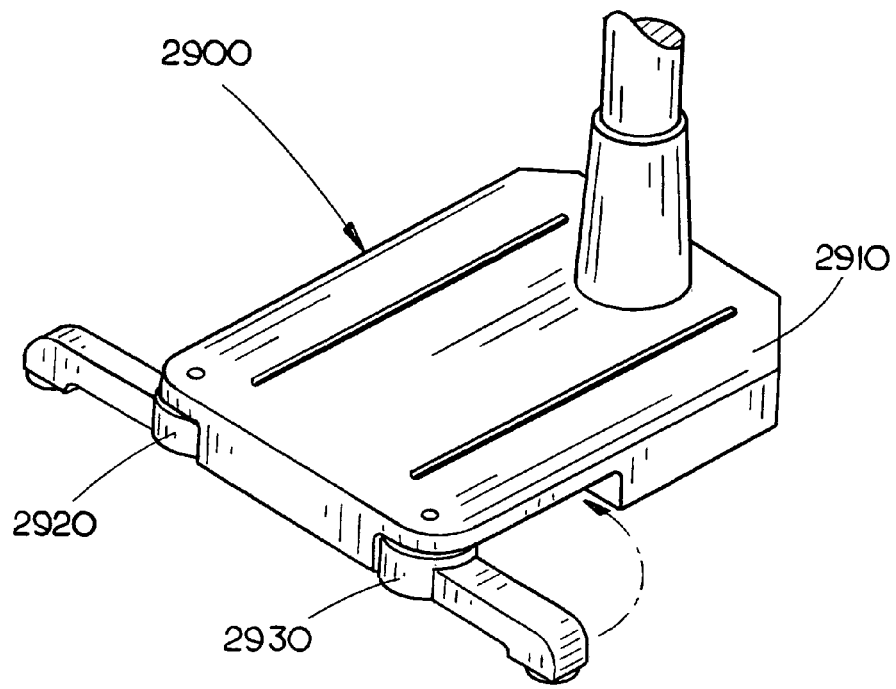
FIG. 29 is an illustration of a first stabilizing stand assembly in accordance with an exemplary embodiment of the present invention.

Connected with the bottom end 114 of the bench column 110 is the stabilizing stand assembly 400. The stabilizing stand assembly 400 may include a variety of features as exemplified in FIGS. 29, 30, and 31. In the embodiment shown in FIG. 29, a stabilizing stand assembly 2900 comprises a stand 2910 connected with a pivoting feet assembly comprising a first pivoting foot 2920 and a second pivoting foot 2930. It is understood that the generally rectangular block of the first exemplary embodiment may include the pivoting feet assembly and the polygonal shaped block may include the notch. The first pivoting foot 2920 may be generally disposed upon the front edge proximal to the left side while the second pivoting foot 2930 may be generally disposed upon the front edge proximal to the right side. Both the left and right sides may include a recessed area to allow for the first and second pivoting feet to be received when not in use. The size of the first and second pivoting feet may vary as contemplated by those of ordinary skill.

Figure 30:
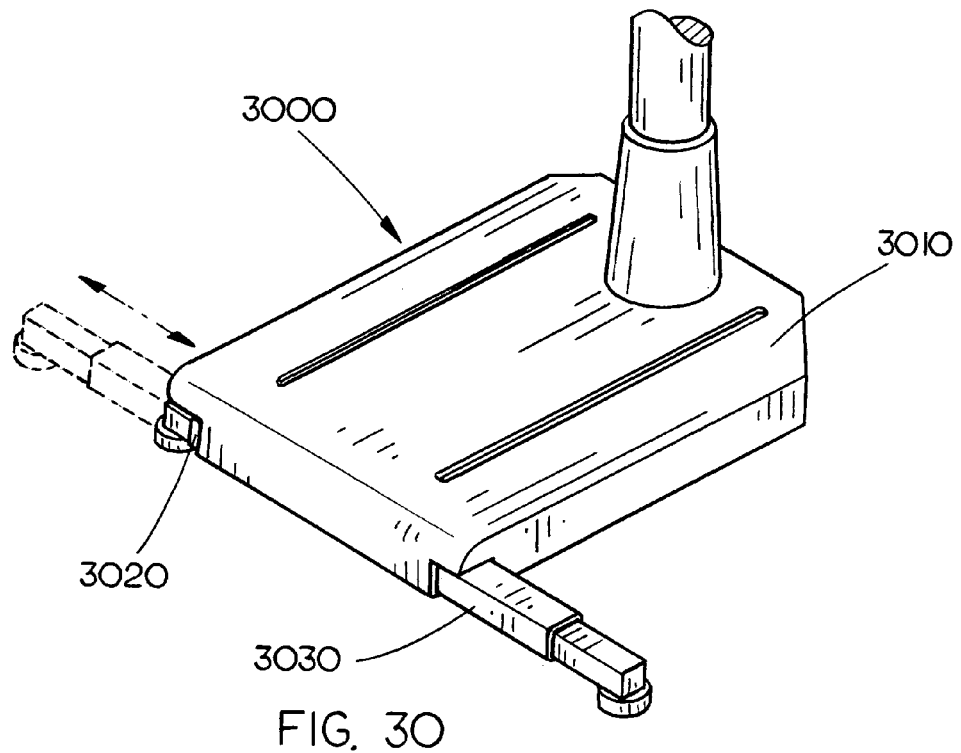
FIG. 30 is an illustration of a second exemplary stabilizing stand assembly.

Referring now to FIG. 30, a stabilizing stand assembly 3000 includes a stand 3010 connected with a telescoping support assembly including a first telescoping support member 3020 and a second telescoping support member 3030. The telescoping support members are constructed to retract and extend from the stand 3010. In the current embodiment, the first telescoping support member 3020 is generally disposed at the front, left corner of the stand 3010 and the second telescoping support member 303 is generally disposed at the front, right corner of the stand 3010. It is contemplated that the length of the telescoping support members may vary without departing from the scope and spirit of the present invention. It is farther contemplated that the telescoping support assembly may include pivot devices connected to the first and second telescoping support members to allow for rotational adjustment of the support members by a user.

Figure 31:
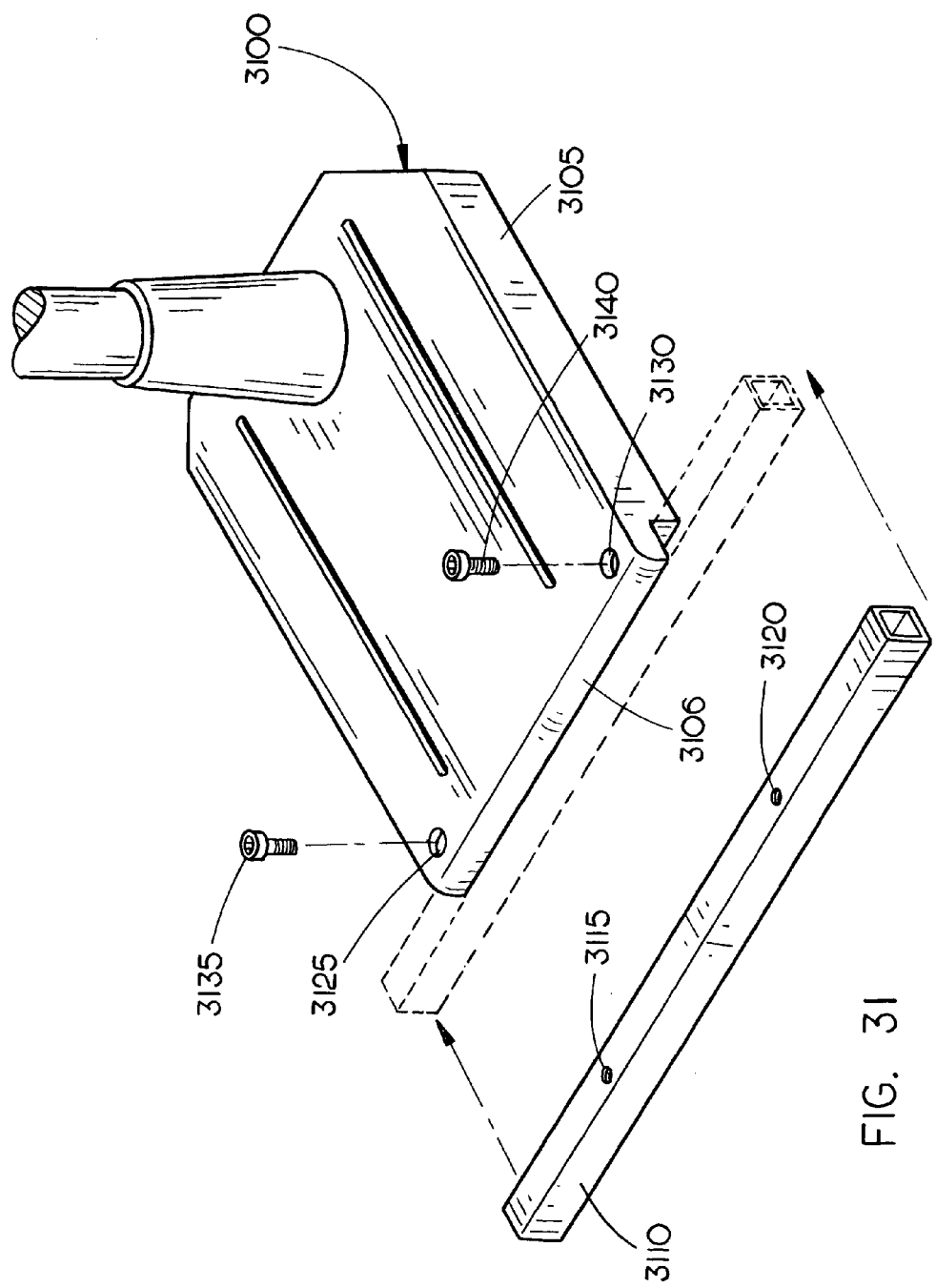
FIG. 31 is an illustration of a third exemplary stabilizing stand assembly.

In an alternative embodiment, a stabilizing stand assembly 3100 including a stand 3105 connecting with a generally rectangular block 3110, is shown in FIG. 31. The stand 3105. A front edge 3106 of the stand 3105 includes a notch which extends along the length of the front edge 3106. The notch is generally disposed along the front edge proximal to the bottom side. Preferably, the notch extends from the bottom of the front edge to approximately halfway up the front edge although various other configurations are contemplated. The notch allows the user to place a support bar/board/block into the notch to provide increased stability and to assist in avoiding tipping of the drill press.

In the current embodiment, a block 3110 is connected with the notch. The block 3110 is generally rectangular in shape having a hollow interior. Disposed on a top side of the block 3110 is a first bench column connection receiver 3115 and a second bench column connection receiver 3120. It is understood that the receivers may be located in various positions upon the block. When the block 3110 is properly connected within the notch of the stand 3105, the first and second bench column connection receivers align with the first stand receiver 3125 and the second stand receiver 3130, respectively. This alignment of the receivers allows fasteners 3135 and 3140 to engage with the receivers and securely affix the block 3110 within the notch. In the current embodiment, the fasteners are threaded bolts engaging within threaded receivers. It is contemplated that the notch may connect with the block 3110 through the use of various fasteners and/or connection mechanisms. For instance, clips, pins, screws, and the like may be employed and/or a friction fit mechanism, snap fit mechanism, compression lock mechanism and the like may provide the secure connection.

It is further contemplated that the exemplary embodiments of the stabilizing stand assembly shown in FIGS. 1, 24, 29, 30, and 31 may further include tie down fastening points for affixing the location of the drill press. The tie down fastening points allowing for a tie to be inserted through and engaged with the fastening points, wherein the tie also connects with or into a surface upon which the stand is situated. In the alternative, the stabilizing stand assemblies may include various securing devices. For example, the bottom side of the stand may include adhesive pads for adhering the stand to a surface. Various other securing devices as contemplated by those of ordinary skill in the art may be employed without departing from the scope and spirit of the present invention.

Connected with the bench column 110, between the top end 112 and bottom end 114, is a bench (table) assembly 300, hereinafter referred to as the table assembly. The table assembly comprises a collar 305 which couples with the bench column 110. The bench column 110 includes a collar adjustment strip 111. The collar 305 further includes a collar adjustment handle 306 which mechanically engages with a worm drive mechanism disposed within the collar 305. The worm drive mechanism is connected against the collar adjustment strip 111 and when the collar adjustment handle 306 is rotated, the worm drive adjusts the position of the collar 305 up and down the length of the collar adjustment strip 111. It is contemplated that various other mechanical adjustment mechanisms which enable the movement of the collar 305 along the length of the bench column 110 may be employed. Further, the collar 305 may include a locking mechanism to securely affix the location of the collar 305 relative to the bench column 110. For instance, a collar locking handle, collar locking button, and the like, may operational couple with the system described above, via the collar 305, to provide for securely affixing the location of the collar 305.

The collar 305 further couples with a first end 315 of an adjustable arm 310. In FIG. 1 the adjustable arm 310 may be extended away from the collar 305 and/or retracted towards the collar 305 by a sliding movement, which may be performed by the user. It is contemplated that a friction fit mechanism is employed to secure the position of the adjustable arm 310 relative to the collar 305. In FIG. 24, connected with the collar 305 and the first end 315 of the adjustable arm 310 is a mechanical connector 325. The mechanical connector 325 provides for the securing and release of the position of the adjustable arm 310 relative to the collar 305. For example, a user may rotate the mechanical connector 325 into a released position whereby the arm 310 may be extended a pre-determined distance away from the collar 305 or retracted towards the collar 305. The mechanical connector 325 may be rotated into a locked position whereby the position of the arm 310 is secured relative to the collar 305.

A second end 320 of the adjustable arm 310 includes a clamp 330. The clamp 330 provides a securing device for connecting the second end 320 of the adjustable arm 310 with a table post 340. The clamp 330 allows for the release of the table post 340 through the mechanical action of a handle 335.

In a preferred embodiment, the table post 340 is constructed as a generally cylindrical hollow tube. A first end 342 of the table post 340 connects with a work table 350. The work table 350 provides the surface upon which a workpiece, to be operated upon by the drill press, may be seated. A second end 344 of the table post 340 may be connected with a dust transfer device 390, as shown in FIG. 24. The dust transfer device 360 may be a standard vacuum tube allowing for the suction of dust and debris through the table post 340 and down through the dust transfer device 390.

It is contemplated that the second end 320 of the adjustable arm 310 may couple with a rotational adjustment flange to allow for the adjustment of the table 350. Connected with a first side of the rotational adjustment flange may be a first table arm and coupled with the second side of the rotational adjustment flange may be a second table arm. The rotational adjustment flange may further include a dust collection "U" shaped groove. The first and second table arms couple with an underside of the table 350.

The first end 342 of the table post 340 may connect with a table adjustment assembly which in turn connects with the table 350. The table angular adjustment assembly may enable the adjustment of the table 350 in multiple directions. For instance, the table 350 may be rotated to the right and/or left and the table may be pivoted up and/or down. Further, the table 350 may be allowed to slide in and out relative to the bench column 110. The rotational adjustment capabilities are enabled by the rotational adjustment flange coupled with the arm, as described above. It is understood that the rotational adjustment flange may be of various configurations. For example, the flange may couple with the arm assembly proximal to the arm's coupling with the collar, the flange may couple at the opposite end of the arm's coupling with the collar, as far from the collar as possible, or the flange may couple at various points of the arm between these aforementioned points. The adjustment of the table in the up and down, or vertical axis, direction is enabled by the first table arm and the second table arm. In a preferred embodiment, the first and second table arms are coupled with the first and second sides of the rotational adjustment flange. Each arm is coupled via a rotational coupling assembly with the rotational adjustment flange. The rotational adjustment assembly allows the first and second arms to rotate up or down relative to the rotation adjustment flange. In the current embodiment, a first and a second angular identification assembly is disposed upon an area on the first and second sides of the rotational adjustment flange. The first and second angular identification assembly provides an indication to the user of the drill press of the angle of presentation of the table in the vertical axis. The angular identification assembly may comprise a label with numeric indicators printed upon it, an engraving of the indicators may be made, the indicators may be painted on, or other methods of establishing these indicators in these locations may be used.

The table angular adjustment assembly includes a table angle engagement mechanism. The table angle engagement mechanism includes a plurality of handles for engagement by the operator of the drill press so that they may make the angular adjustments to the table 350 needed to accomplish a specific task. The handles may be enabled in a variety of configurations as contemplated by those of ordinary skill. For example, the handles may be quick grip handles. The quick grip handles, due to being constructed as spring loaded handles, when squeezed within the grasp of a user's hand allow for adjustment of the table 350 and require only that the user release the handle in order to secure the position of the table 350. The table angle engagement mechanism may be connected in various locations about the drill press. For instance, the handles of the table angle engagement mechanism may be connected with the cross slots (described below) on the underside of the table 350. Alternatively, the handles may be connected with the rotational adjustment flange, the adjustable arm 310, the collar 305, the bench column 110, and the like without departing from the scope and spirit of the present invention. It is understood that the various components and features of the table angular adjustment assembly may vary in configuration and coupling arrangement as contemplated by one of ordinary skill.

Figure 25:
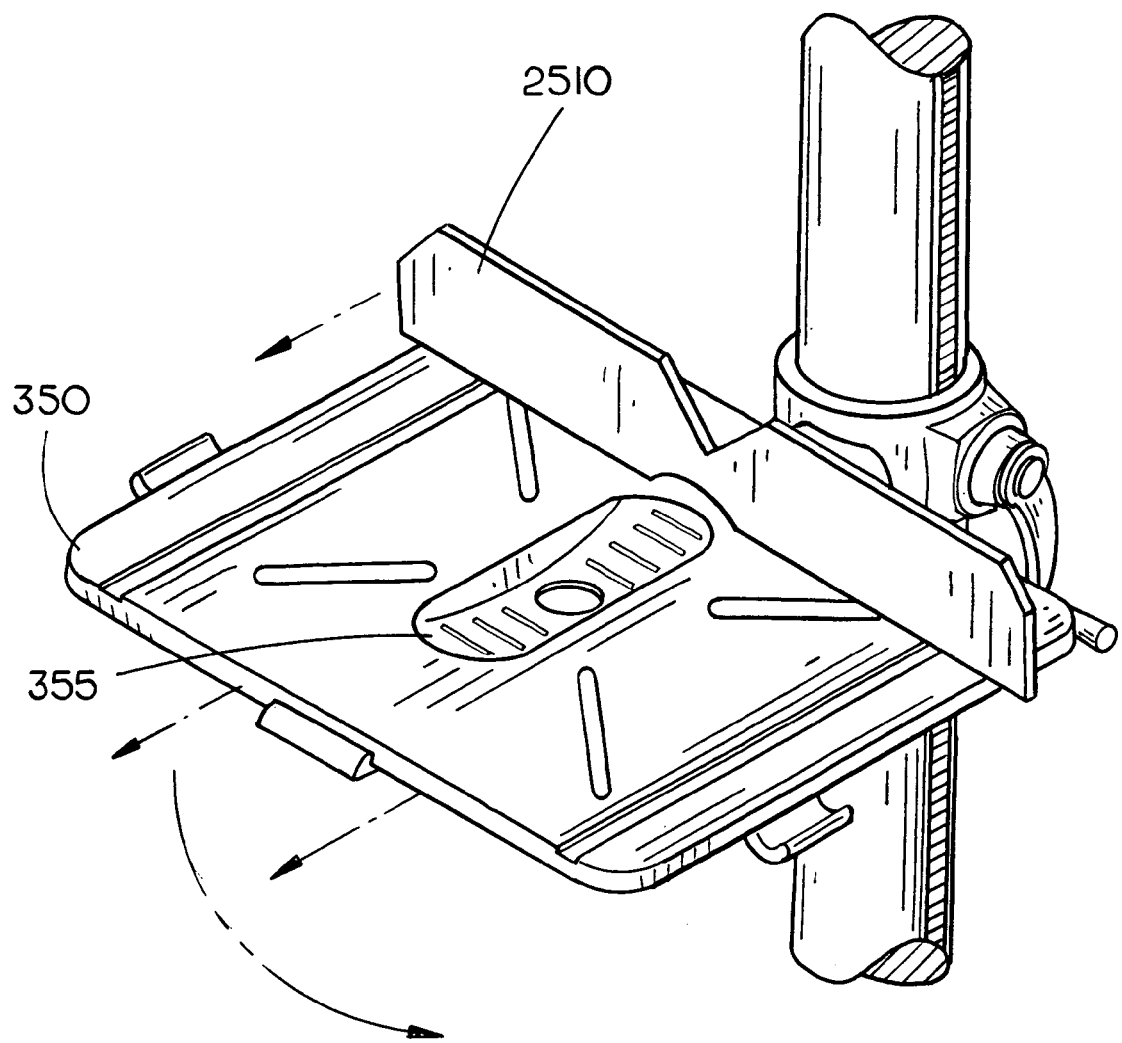
FIG. 25 is an illustration of the drill press of FIG. 1 including a fence assembly connected with an adjustable bench.
Figure 26:
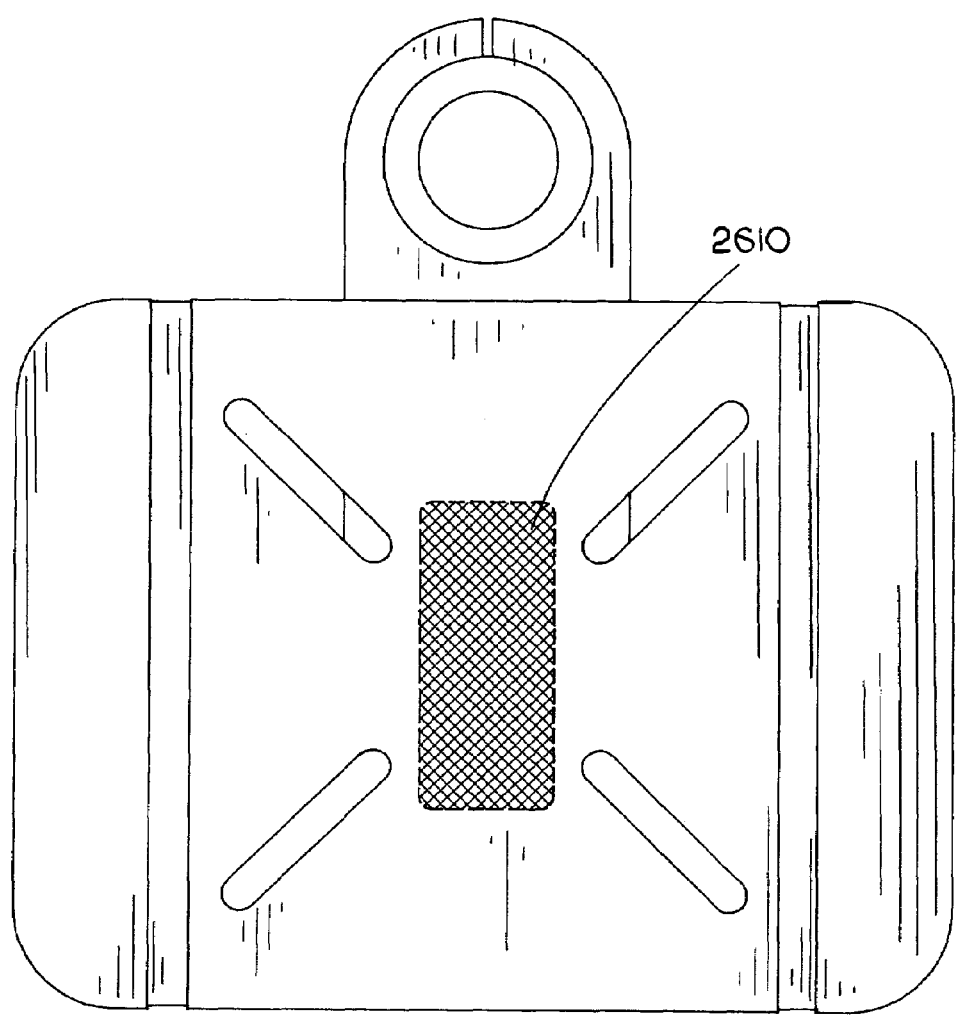
FIG. 26 is an illustration of the drill press of FIG. 1 including a dust collection throat plate disposed within the adjustable bench.

An underside of the table 350 may be configured with a central support assembly which covers at least a part of the underside of the table. In operation, the edges provide a lip on the table which provides multiple/non-restricting ways of coupling devices with the table. For example, the user may wish to secure the location of a workpiece upon the top side of the table and couple a "C" clamp onto the workpiece and one of the edges of the table. With the thinner edges, the "C" clamp may be allowed to couple more securely and easily with the table than with an edge that was of greater thickness or presented with an angle. Other devices, such as quick grip clamps and the like may also be allowed to couple more securely and easily with the thin edges of the present invention. The table 350 may further comprise a plurality of cross slots which may extend from a top side through the bottom side and/or present as grooves in the top side without extending through the bottom side. The plurality of cross slots may be positioned in various locations upon the table 350 in order to enable functionality of the table. Additionally, the table may comprise "T" slots, as shown in FIGS. 25 and 26, which are configured as grooves extending along the top side from the front to back edge, proximal to the right and left edge. The "T" slots may provide the advantage of allowing the connection of a fence assembly 2510, as shown in FIG. 25, in various locations upon the top side of the table 350. Further, the fence assembly may be adjustable upon the top side of the table 350 within the "T" slots and be able to be removed from its connection with the table 350. It is contemplated that the configuration of the cross slots and "T" slots may vary as contemplated by those of ordinary skill. It is also contemplated that the table 350 may include various other features in combination with the cross slots and "T" slots or as single features disposed upon the top side.

Figure 27:
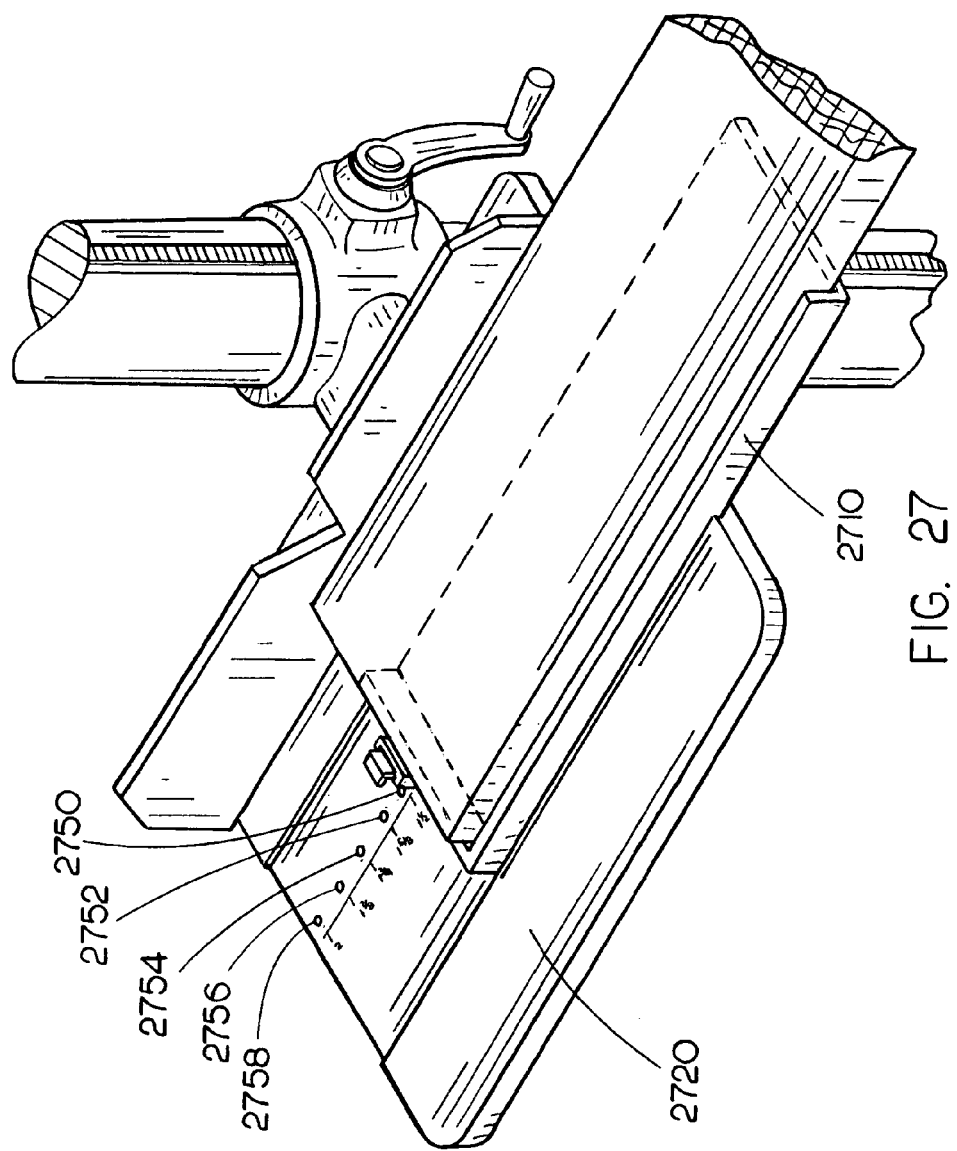
FIG. 27 is an illustration of the drill press of FIG. 1 including an exemplary milling bench.

The table 350 of the present invention may be enabled for operation in a variety of ways. For example, the table may be enabled as a milling table, as shown in FIG. 27, comprising a central member 2710 disposed within a top side of a stationary table member 2720. The central member 2710 may be slidably coupled with the top side, enabled to be slid to the right and/or left of the stationary table member 2720. The adjustability of the central member 2710 may be enabled by a variety of mechanisms including a crank assembly having a rotatable handle coupled with a rack which engages a pinion disposed on the central member. Alternatively, the table may include a metering assembly. This metering assembly may comprise a plurality of fastening points 2750, 2752, 2754, 2756, and 2758 disposed through the top side of the stationary table member 2720. In operation, when a hole is drilled through a workpiece a pin may be extended through the hole and engaged with one of the plurality of fastening points. This affixes the location of the workpiece on the table. The plurality of fastening points may be evenly spaced in order to provide precise repeatable spacing between drill points. Other alternative embodiments of the table, as contemplated by those of ordinary skill in the art, may be employed without departing from the scope and spirit of the present invention.

Additionally, the collar 305 may be disposed with a height adjustment system including a pinion assembly disposed within the collar 305. The pinion assembly may include a pinion disposed on the interior of the collar and a rotational engagement assembly coupled through the collar 305 with the pinion. The rotational engagement assembly may be a handle, such as a wheel handle, which is rotatably engaged by the user of the drill press. The pinion may engage with a rack disposed on the bench column 110. The rack is operationally engaged by the pinion, thus, as the pinion is rotated by the handle, the collar is moved vertically, either up or down, along the rack of the bench column.

In a preferred embodiment, the rotational adjustment assembly may be disposed near the collar 305. Alternatively, the rotational adjustment assembly may be disposed in various locations, such as near the front of the table 350. It is contemplated that the rotational adjustment assembly includes a macro adjust and micro adjust assemblies. For example, the macro adjust assembly may be a larger outer wheel handle while the micro adjust may be a smaller diameter wheel handle disposed within the larger outer wheel. Further, the height adjustment system may include a locking mechanism to securely affix the location of the collar relative to the bench column. For instance, a collar locking handle, collar locking button, and the like, may operationally couple with the rack and pinion system described above, via the collar, to provide for securely affixing the location of the collar.

It is contemplated that the movement of the collar 305 along the length of the bench column 110 may be enabled as a powered system. For example, an electrically powered system, hydraulically powered system, and the like may provide for the movement of the collar 305. Further, the location of the controls, e.g., rotational adjustment assembly, and other control mechanisms as contemplated, may be located in various places. For instance, the controls may be placed in proximal location to the feet of the operator of the drill press and may include pedals.

The dust transfer device 390 may be a part of a dust collection system operationally coupled with the table 350 of the present invention. The table 350 may further include a throat plate 2610, as shown in FIG. 26, which couples with the center of the top side of the table. The throat plate 2610, in the current embodiment, is a rectangular plate with a plurality of openings constructed within it. The throat plate may be removed from the top side of the table and replaced with a second throat plate with a different design configuration. It is contemplated that a generic throat plate may be provided and the user of the drill press may be able to customize the throat plate to meet specific needs. Further, it is contemplated that various packages of throat plates, including varying numbers of throat plates, with various design configurations may be provided by the present invention. Further, the shape and size of the throat plate may be varied as contemplated by one of ordinary skill in the art to couple with the table of the drill press. Additionally, the throat plate may be engaged in various locations upon the top side of the table. The plurality of slots within the throat plate allow for dust and debris to be drawn through them. As will be described below, the slots may allow air to be vacuumed through them, thereby collecting the dust and debris in the air.

The dust collection throat plate 2610 couples with the top side of the table 350 over a dust collection cavity 355, shown in FIG. 26, which is a recessed area defined within the table 350 extending from the top side through the bottom side. The dust collection cavity 355 is generally enabled as a reducer, providing a funneling down effect for dust and debris collected through the plurality of slots within the throat plate 2610. Coupled with the bottom of the dust collection cavity 355 is the table post 340 which connects with the dust transfer device 390. The dust transfer device is a standard vacuum tube, as previously described, which couples with the bottom of the dust collection cavity 355, via the table post 340, and extends a pre-determined length away from the dust collection cavity 355.

Where the table is connected via a rotation adjustment assembly with the bench column, it may be clearly seen that a tube extends through the dust collection "U" shaped groove in the arm assembly. The tube may be engaged by a dust hose (dust transfer device) which is further coupled with a vacuum pump assembly for creating a vacuum through the dust collection system. The dust hose may couple with the tube through the use of a ring clamp or other devices. It is understood that the configuration of the various components of the dust collection system may be varied as contemplated by one of ordinary skill in the art.

It is contemplated that the throat plate disposed within the work table 350 may be a laser activated throat plate assembly. A laser activated throat plate assembly may provide a visual indication of the location of the laser beam(s) being emitted from the power tool control system laser source(s). The visual indication may be a lighted portion of the throat plate, which is activated when contacted by a laser beam. The lighted portion may vary in size and configuration. The visual indicator of the throat plate may provide an indication of the operational position of the drill bit.

The work table 350 may include one or more laser activated sections. The laser activated sections providing an indication of the location of the laser beam(s). It is also contemplated that the laser activated sections may be employed for use with the work table 350 when the work table 350 is configured as a milling table or with an indexing functionality. The size and configuration of the laser activated sections may vary. For instance, the laser activated sections may provide a visual representation of the crosshairs, indicating the operational position of the drill bit. Alternatively, the laser activated sections may be individual bars located in parallel, spanning the table in order to provide an indexing functionality.

It is contemplated that the laser activated throat plate assembly and/or sections of the work table may include various mechanisms for providing a visual indicator. For example, sensor assemblies linked with light emitting diodes may be included within either of the embodiments. The sensor assemblies for detecting the laser beam(s) and the LEDs for illuminating a location or index point. Alternatively, various substances which activate (i.e., illuminate)

when struck by laser beam(s) may be included within either of these embodiments to provide a visual indicator.

Figure 32:
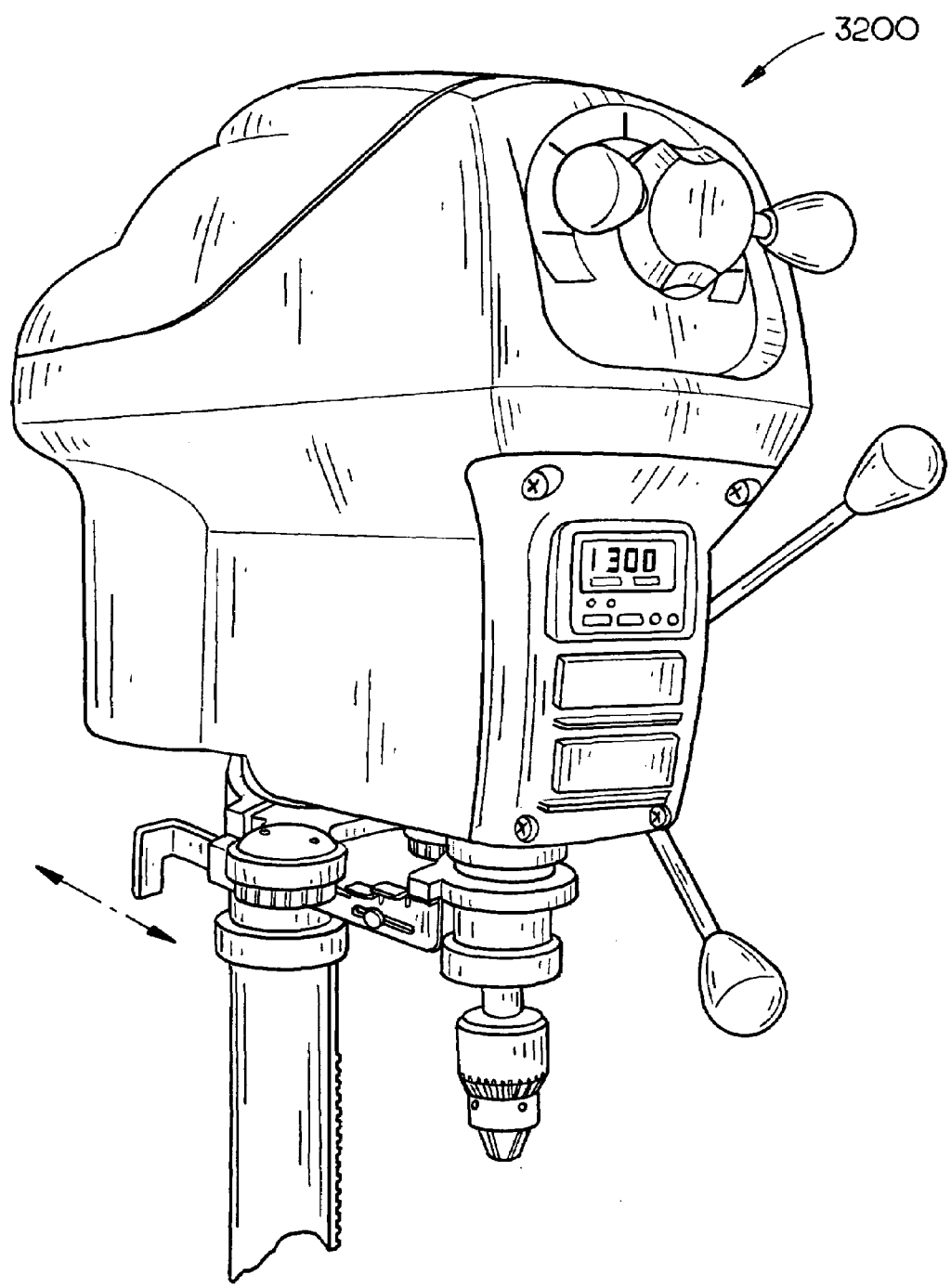
FIG. 32 is an illustration of a drill multi depth adjustment assembly in accordance with an exemplary embodiment of the present invention.

The present invention contemplates the use of a drill multi depth adjustment assembly 3200, as shown in FIG. 32. The drill multi depth adjustment assembly 3200 comprises a multi position member 3210 which may engage with a drill bit stop member 3220 to provide the multi depth functionality for the drill bit. The multi position member 3210 provides multiple pre-set depth stops so that when the drill bit is being plunged the drill bit stop member 3220 may be engaged with one of the pre-set depth stops of the multi position member 3210 and establish a desired drill depth. The multi position member 3210 may be coupled to a side of the head assembly in a manner which allows the multi position member 3210 to be adjusted. The adjustment capabilities of the multi position member 3210 may include the ability to slide or rotate the multi position member 3210 into a desired position. This allows the multi position member 3210 to be engaged with or not engaged with the drill head. The disengagement capability is advantageous in that it enables the drill head to by pass and avoid any unwanted stops, thereby allowing full drill depth functionality.

It is contemplated that the drill multi depth adjustment assembly 3200 may have its functionality enabled by operationally coupling with the quill assembly of the drill press. For example, the stop member may be disposed on the left side of the drill bit and stick out from the drill head to engage with the pre set stops of the multi position member. As may be seen from the illustrations of FIGS. 33 and 34, the multi position member may be variously configured. Further, the pre-set stops may establish a range of drill depth adjustment capabilities. For example, from ⅛ inch to ⅝ inch or other ranges as may be contemplated by those of ordinary skill. It is understood that the configuration of the multi position member may vary to encompass fewer or greater pre-set stops, a broader range of adjustable capability, and the like without departing from the scope and spirit of the present invention.

Figure 33:
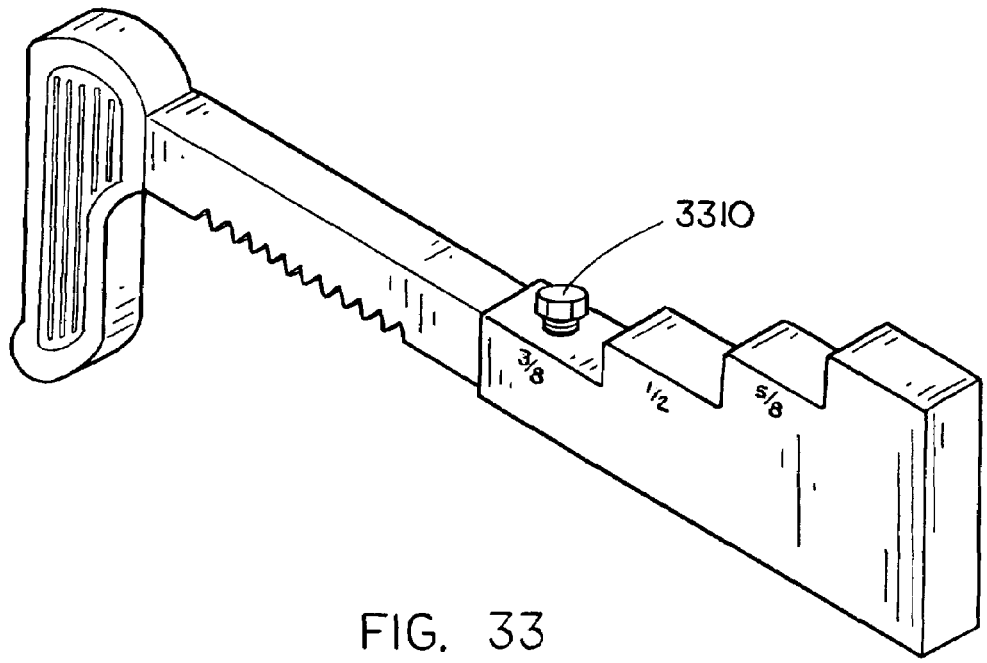
FIG. 33 is an illustration of a multi position member of the drill multi depth adjustment assembly.

In the embodiment shown in FIG. 33, the multi position member includes a micro adjustment assembly 3310. The micro adjustment assembly 3310 is constructed with a fastening point bored into one of the pre-set stops of the multi position member. This fastening point is threaded for engagement by a depth adjust fastener. The depth adjust fastener 3310 may be a screw, pin, bolt, and the like, enabled to engage with the threads of the fastening points and be engaged by the drill bit stop member. The depth adjust fastener 3310 is enabled to be rotated in either direction within the fastening point, thereby presenting at various heights above and relative to the height of the pre-set stop on the multi position member. In operation, the pre-set stops may be ⅜ inch, ½ inch, and ⅝ inch. The depth adjust fastener 3310 may be engaged in the ⅜ inch pre-set stop which further includes the fastening point. The user may engage with the depth adjust fastener 3310, adjusting its position within the fastening point, thereby enabling the drill bit stop member to engage against the dept adjust fastener 3310 in a position between the ⅜ inch pre-set stop and the ½ inch pre-set stops.

Figure 34:
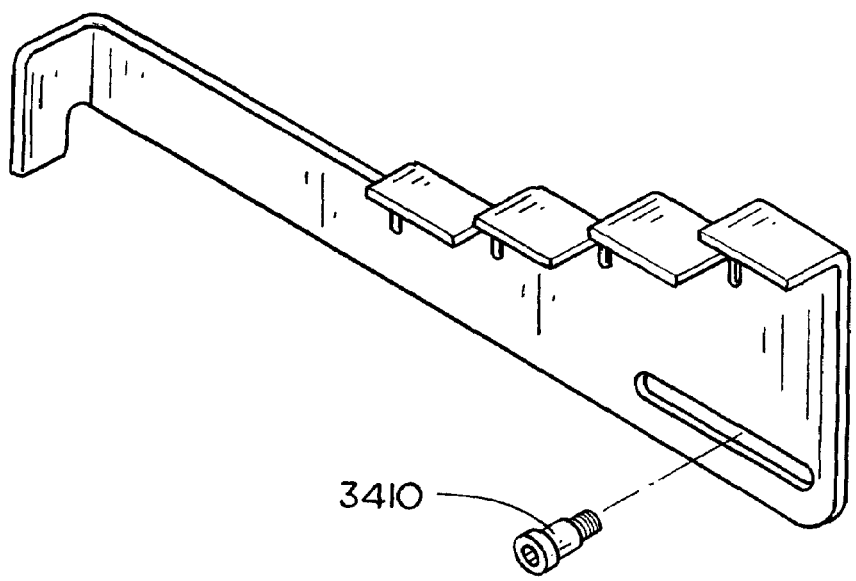
FIG. 34 is an illustration of a second exemplary multi position member of the drill multi depth adjustment assembly.

Other pre-set depth adjustment settings may be employed with the present invention to provide increased functionality. Additionally, other micro adjustment assemblies may be employed as contemplated by those of ordinary skill in the art. The sliding of the multi position member into engagement with or disengagement from the drill head of the quill assembly may be enabled through a variety of mechanisms. In FIG. 33 a handle mechanism provides a grip for a user and pre-set stops for securely engaging the multi position member at the desired position. FIG. 34 shows the multi position member, enabled as a sheet metal configuration, with a slotted area for engagement by a fastener 3410. The engagement of the fastener 3410 with the slotted area enables the sliding engagement of the sheet metal multi position member with the drill head of the quill assembly. It is further contemplated that the multi position member may operationally engage with various component features of the drill press to enable the drill depth adjustment capabilities described above.

Figure 35:
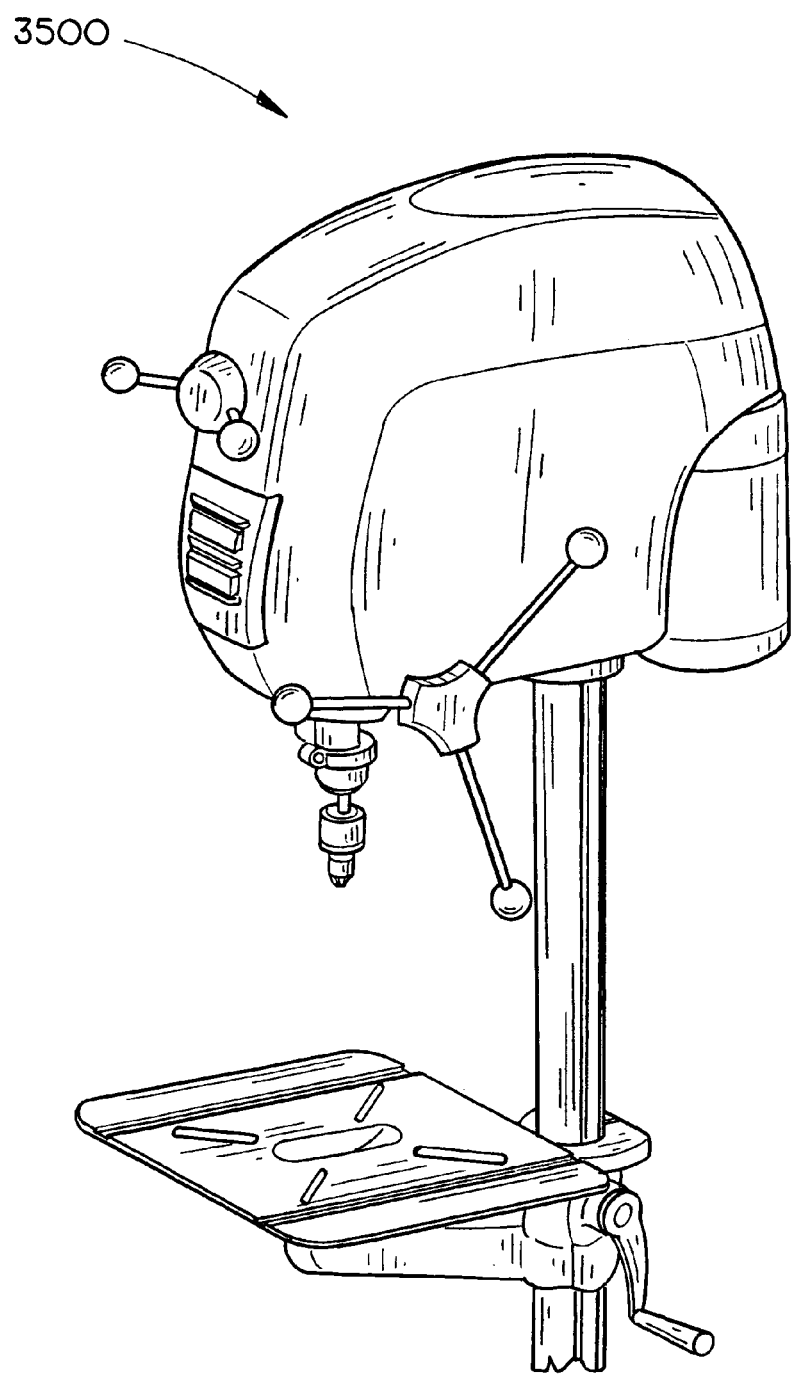
FIGS. 35, 36, and 37 illustrate variously configured head assemblies which may be employed in accordance with exemplary embodiments of the present invention.
Figure 36:
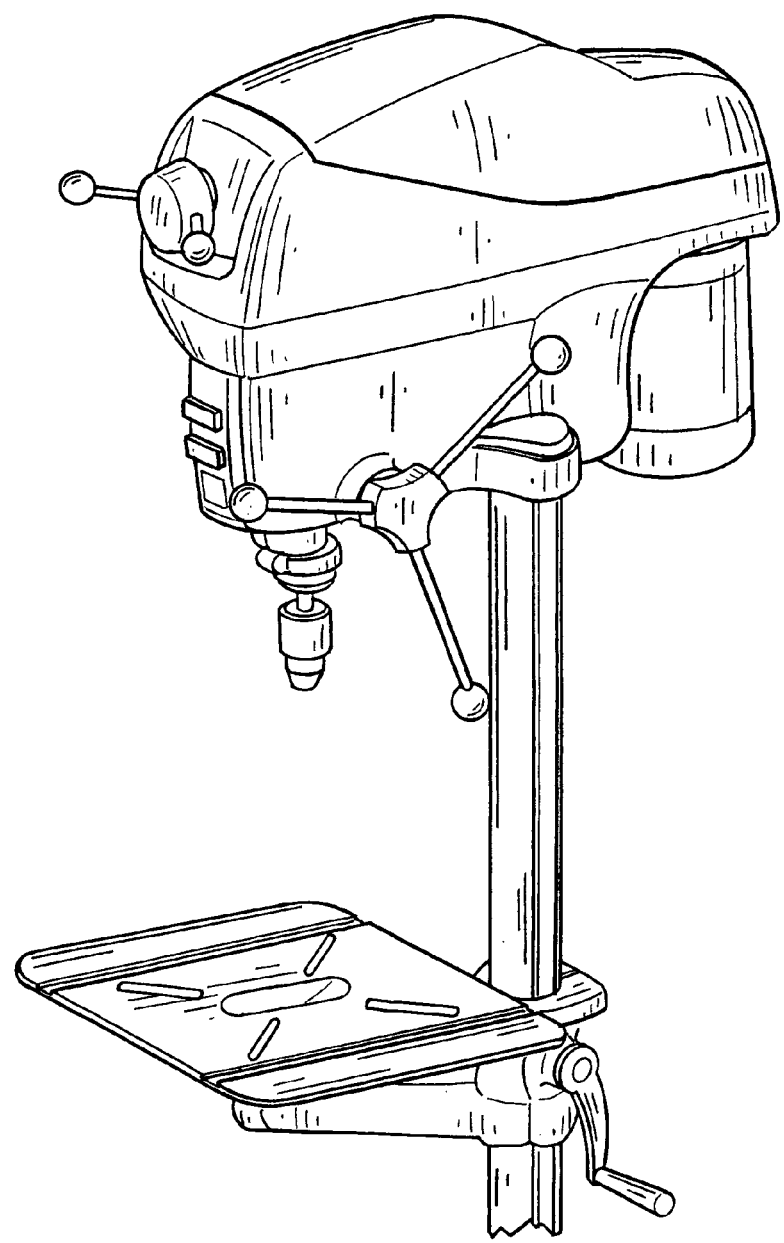
Figure 37:
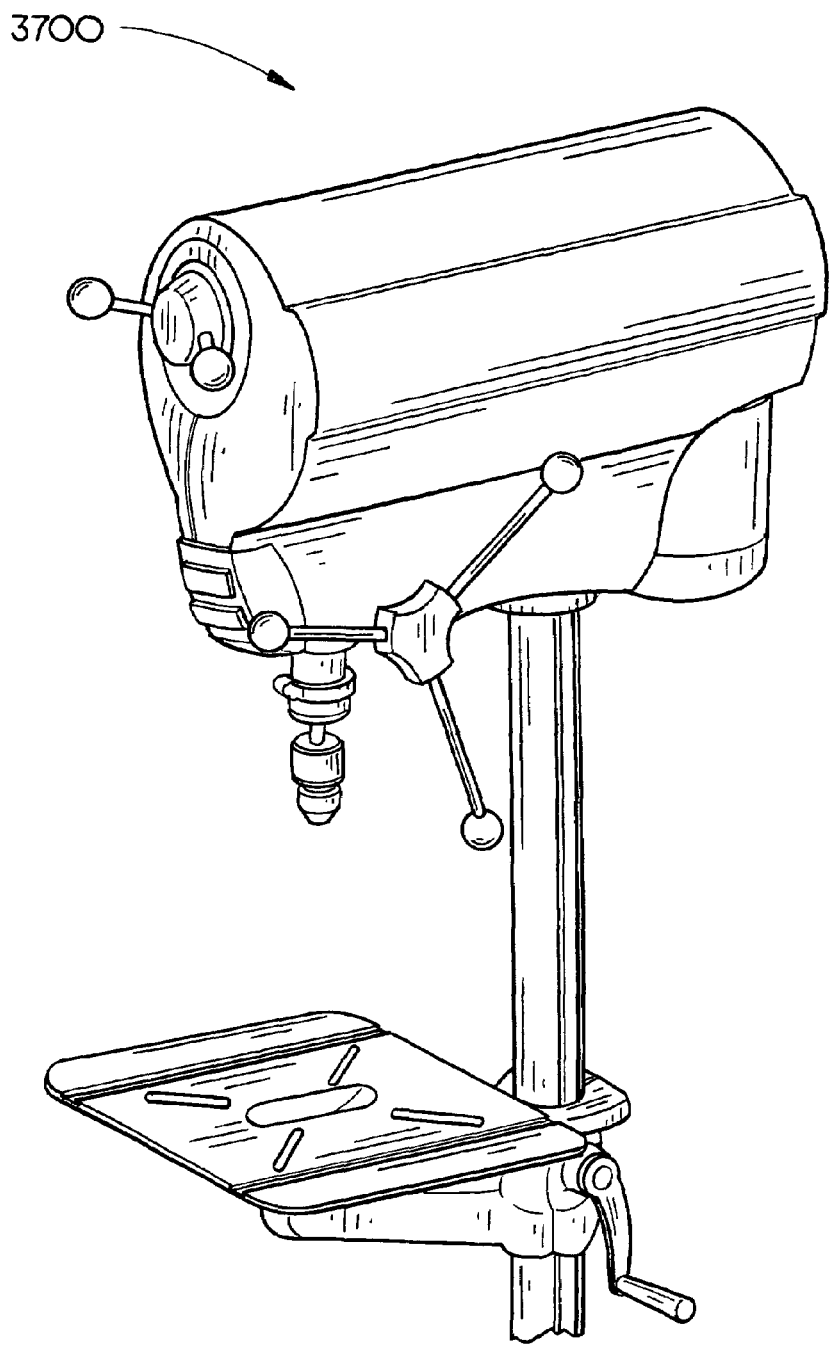

FIGS. 35, 36, and 37, illustrate a drill press 3500, 3600, 3700, respectively, are including a head assembly shaped in a first, a second, and a third configuration. The drill presses of FIGS. 35 through 37 may be similar in every respect to the drill press shown and described in FIGS. 1 through 34, except for the shape of the head assembly. It is further contemplated that the drill presses shown in FIGS. 1 through 37 may not include the power tool control system as described previously. In the alternative, the drill presses of FIGS. 1 through 37 may include various component features in a variety of combinations without departing from the scope and spirit of the present invention. For instance, a drill press may include the user interface (control panel) as described in reference to FIGS. 1 through 37, but not include the casing and laser component features. In the alternative, a drill press may be enabled with the power tool control system but not the table angular adjustment assembly, as described previously. It is to be understood that the use of the component features described herein and the combination of component features may be determined by those of skill in the art and that the various configurations of the drill press are within the scope and spirit of the present invention.

In the preferred embodiments of FIGS. 1 through 37, the user interface (control panel) 150 is connected with the head assembly of the drill press in a location which is optimal for the user of the drill press to access its functionality. It is understood that the user interface (control panel) 150 may be established in various locations upon the drill press or in other locations. It is contemplated that the user interface (control panel) 150 may be enabled as a modular device capable of being mounted upon and removed from the drill press. The modular functionality may be enabled through a drill press adapter system which provides a communication port for the user interface (control panel) 150 to interface with the laser sources, when mounted upon the drill press. The port may further enable wireless communication between the user interface (control panel) 150 and the laser sources and/or drill press when the user interface (control panel) 150 is removed from the drill press. Those of ordinary skill in the art will appreciate that various wireless technologies may be employed to enable the communication capabilities of the user interface (control panel) 150 and the drill press without departing from the scope and spirit of the present invention.

The configuration of the user interface (control panel) 150 may be optimally established in conjunction with and in order to accommodate increased efficiency and aesthetic concerns of the drill press. In the present embodiment, the configuration is similar to a rectangle box. The depth of such a rectangular box, as shown, may be varied in order to enable the control panel to be mounted upon the drill press. Further, the configuration may be adapted for the use of the user interface (control panel) 150 as a hand held device when removed from the drill press. It is contemplated that the configuration of the user interface (control panel) 150 may be a variety of geometric configurations. Further, the user interface (control panel) 150 may include contouring and be coupled with various other materials to assist in increasing its aesthetic appeal, ease of use, comfort of the user, gripability by the user, and the like.

It is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A drill press, including a drill bit connected to a motor via a quill assembly, the drill bit for engaging a workpiece seated upon a work table of the drill press, comprising:
    a bench column including a first end connected with a head assembly and a second end connected with a stabilizing stand assembly, the bench column further connected with the work table;
    a fence assembly; and
    a power tool control system connected with the bench column, the power tool control system connected in a position correlating with the work table,
    wherein the power tool control system provides a measure of a structural factor of the workpiece for use in determining operational settings of the drill press.

2. The drill press of claim 1, further comprising a dust collection system.

3. The drill press of claim 1, further comprising an adjustable feed handle assembly.

4. The drill press of claim 1, further comprising an adjustable arm.

5. The drill press of claim 1, further comprising a table angular adjustment assembly.

6. The drill press of claim 1, wherein the work table is a milling table.

7. The drill press of claim 1, wherein the work table includes a throat plate.

8. The drill press of claim 1, wherein the work table includes a laser activated section.

9. The drill press of claim 1, further comprising a multi-depth adjustment assembly.

10. The drill press of claim 1, further comprising a stabilizing stand assembly.

11. The drill press of claim 1, further comprising an ergonomic chuck key.

12. The drill press of claim 1, wherein the power tool control system further comprises: a casing including a receiver, the casing being connected with the drill press; and
    a laser mount connected with a laser source for emitting a laser beam, the laser mount for being received by the receiver.

13. The drill press of claim 1, wherein the power tool control system further comprises: a casing including a first receiver and a second receiver, the casing being connected with the drill press;
    a first laser mount connected with a first laser source for emitting a first laser beam, the first laser mount for being received by the first receiver; and
    a second laser mount connected with a second laser source for emitting a second laser beam, the second laser mount for being received by the second receiver.

14. The power tool control system of claim 1, further comprising a casing adjustment mechanism.

15. The power tool control system of claim 1, further comprising a laser mount adjustment mechanism.

16. The power tool control system of claim 1, further comprising a laser source adjustment mechanism.

17. The power tool control system of claim 1, further comprising a laser beam adjustment mechanism.

18. A method of operating a drill press, including a work table for engaging a drill bit with a workpiece, comprising:
    determining a first distance, the first distance comprising the distance of the work table from a casing connected with a laser source, the casing connected with the drill press;
    positioning the workpiece upon the work table; determining a second distance, the second distance comprising the distance from the casing including the laser source to the workpiece;
    calculating the thickness of the workpiece from the determined first and second distances;
    providing the established distance data to the user of the drill press; setting the operational settings of the drill press based on the determined distance data; and
    drilling through the workpiece.

19. The method of claim 18, further comprising the step of automatically setting the operational setting of the drill press based on the determined thickness.

20. The method of claim 18, further comprising: determining a hardness of the workpiece; and setting the operational settings of the drill press based on the determined hardness of the workpiece.

21. A drill press, including a drill bit connected to a motor via a quill assembly, the drill bit for engaging a workpiece seated upon a work table of the drill press, comprising:
    a bench column including a first end connected with a head assembly and a second end connected with a stabilizing stand assembly, the bench column further connected with the work table;
    a multi-depth adjustment assembly connected to the head assembly; and
    a power tool control system connected with the bench column, the power tool control system connected in a position correlating with the work table,
    wherein the power tool control system provides a measure of a structural factor of the workpiece for use in determining operational settings of the drill press.

22. The drill press of claim 21, further comprising a dust collection system.

23. The drill press of claim 21, further comprising an adjustable feed handle assembly.

24. The drill press of claim 21, further comprising an adjustable arm.

25. The drill press of claim 21, further comprising a table angular adjustment assembly.

26. The drill press of claim 21, wherein the work table is a milling table.

27. The drill press of claim 21, wherein the work table includes a throat plate.

28. The drill press of claim 21, wherein the work table includes a laser activated section.

29. The drill press of claim 21, further comprising a fence assembly.

30. The drill press of claim 21, further comprising a multi-depth adjustment assembly.

31. The drill press of claim 21, further comprising a stabilizing stand assembly.

32. The drill press of claim 21, further comprising an ergonomic chuck key.

33. The drill press of claim 21, wherein the power tool control system further comprises: a casing including a receiver, the casing being connected with the drill press; and
    a laser mount connected with a laser source for emitting a laser beam, the laser mount for being received by the receiver.

34. The drill press of claim 21, wherein the power tool control system further comprises: a casing including a first receiver and a second receiver, the casing being connected with the drill press;
    a first laser mount connected with a first laser source for emitting a first laser beam, the first laser mount for being received by the first receiver; and
    a second laser mount connected with a second laser source for emitting a second laser beam, the second laser mount for being received by the second receiver.

35. The power tool control system of claim 21, further comprising a casing adjustment mechanism.

36. The power tool control system of claim 21, further comprising a laser mount adjustment mechanism.

37. The power tool control system of claim 21, further comprising a laser source adjustment mechanism.

38. The power tool control system of claim 21, further comprising a laser beam adjustment mechanism.

\* \* \* \* \*